United States Patent [19]

Huber

[11] Patent Number: 4,791,561

[45] Date of Patent: Dec. 13, 1988

[54] INTERACTIVE CONSTRUCTION OF MEANS FOR DATABASE MAINTENANCE

[75] Inventor: Val J. Huber, Chelmsford, Mass.

[73] Assignee: Wang Laboratories, Inc., Lowell, Mass.

[21] Appl. No.: 171,232

[22] Filed: Mar. 21, 1988

Related U.S. Application Data

[63] Continuation of Ser. No. 40,702, Apr. 17, 1987, abandoned, which is a continuation of Ser. No. 690,844, Jan. 11, 1985, abandoned, which is a continuation-in-part of Ser. No. 687,809, Dec. 31, 1984, abandoned.

[51] Int. Cl.⁴ .............................................. G06F 15/40
[52] U.S. Cl. .................................. 364/300; 364/200
[58] Field of Search ......... 364/200 MS File, 900 MS, 364/300

[56] References Cited

U.S. PATENT DOCUMENTS

| | | | |
|---|---|---|---|
| 4,068,298 | 1/1978 | Dechant et al. | 364/200 |
| 4,186,438 | 1/1980 | Benson et al. | 364/200 |
| 4,384,325 | 5/1983 | Slechta, Jr. et al. | 364/200 |
| 4,468,728 | 4/1984 | Wang | 364/200 |
| 4,476,528 | 10/1984 | Matsumoto et al. | 364/200 |
| 4,479,196 | 10/1984 | Ferrer et al. | 364/900 |
| 4,497,039 | 1/1985 | Kitckomi et al. | 364/900 |
| 4,498,145 | 2/1985 | Baker et al. | 364/900 |
| 4,506,326 | 3/1985 | Shaw et al. | 364/900 |
| 4,514,826 | 4/1985 | Iwata et al. | 364/900 |
| 4,543,630 | 9/1985 | Neches | 364/200 |
| 4,570,217 | 2/1986 | Allen et al. | 364/900 |
| 4,611,298 | 9/1986 | Schuldt | 364/900 |
| 4,613,946 | 9/1986 | Forman | 364/300 |
| 4,631,664 | 12/1986 | Bachman | 364/200 |
| 4,631,673 | 12/1986 | Haas et al. | 364/300 |
| 4,642,762 | 2/1987 | Fisanick | 364/300 |
| 4,644,471 | 2/1987 | Kojima et al. | 364/300 |
| 4,648,044 | 3/1987 | Hardy et al. | 364/300 |

Primary Examiner—Gareth D. Shaw
Assistant Examiner—Kevin A. Kriess
Attorney, Agent, or Firm—Michael H. Shanahan

[57] ABSTRACT

In a data processing system, application programs for the maintenance of a relational database may be constructed interactively and nonprocedurally. A data dictionary and screen-files are defined interactively and nonprocedurally. Data structures represent a meta-dictionary modeled as a relational database, a definition screen-file, a builder screen-file, and a set of archetype screen formats for modification.

8 Claims, 18 Drawing Sheets

Microfiche Appendix Included
(9 Microfiche, 439 Pages)

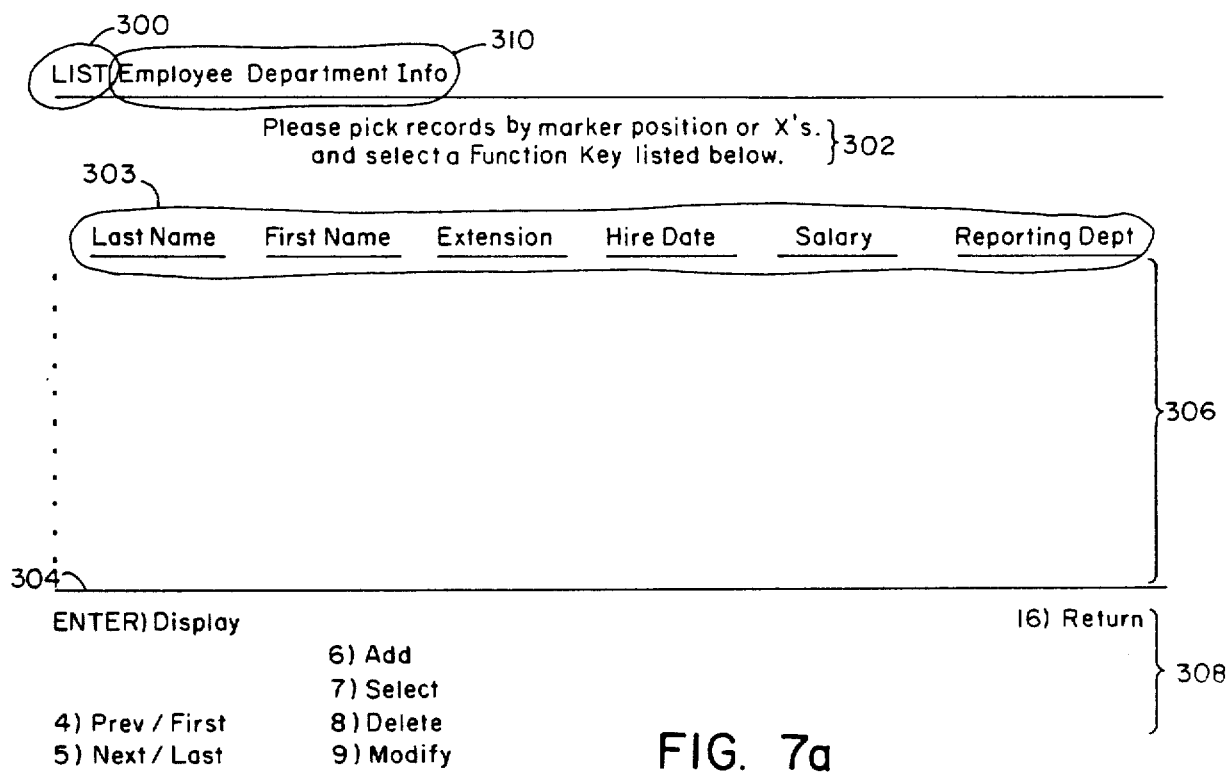

LIST Employee Department Info

Please pick records by marker position or X's. and select a Function Key listed below.

| Last Name | First Name | Extension | Hire Date | Salary | Reporting Dept |
|---|---|---|---|---|---|

ENTER) Display
6) Add
7) Select
4) Prev / First   8) Delete
5) Next / Last   9) Modify
16) Return

FIG. 7a

LIST Employee Department Info

Please pick records by marker position or X's. and select a Function Key listed below.

| Last Name | First Name | Extension | Hire Date | Salary | Reporting Dept |
|---|---|---|---|---|---|
| HORNE | GLENN | 4400 | 02/22/77 | 22,250.00 | MIDWEST |
| HUBER | JANET | 6000 | 12/07/76 | 45,750.00 | NORTHEAST |
| JACOBER | LEVI | 7500 | 04/13/84 | 37,000.00 | INTERNATIONAL |
| KANE | JOHN | 7600 | 06/25/84 | 22,150.00 | PACIFIC |
| KAPLAN | DENNY | 2000 | 12/18/77 | 27,000.00 | EUROPEAN |
| KEATING | WARREN | 5700 | 05/15/84 | 21,250.00 | EUROPEAN |
| LYONS | PAT | 1700 | 12/28/82 | 33,333.00 | NORTHEAST |
| MATHEW | DOUGLAS | 4300 | 06/15/76 | 74,000.00 | INTERNATIONAL |
| MCKEEVER | VAL | 2100 | 06/06/84 | 18,350.00 | EUROPEAN |
| MCKINNEY | KATHY | 5500 | 10/01/81 | 29,500.00 | INTERNATIONAL |
| MORRISSEY | JIM | 6600 | 08/29/82 | 17,500.00 | INTERNATIONAL |

ENTER) Display
6) Add
7) Select
4) Prev / First   8) Delete
5) Next / Last   9) Modify
16) Return

FIG. 7b

| DISPLAY Employee Department Info | |
|---|---|
| Please press a Function Key listed below. | |
| Last Name: | HORNE |
| First Name: | GLENN |
| Extension: | 4400 |
| Hire Date: | 02/22/77 |
| Salary: | 25,250.00 |
| Reporting Dept: | MIDWEST |
| Reporting Dept Location: | CHICAGO |
| Reporting Dept Budget: | 400,000.00 |
| On Loan Dept: | SALES |
| On Loan Dept Location: | LOWELL |
| On Loan Dept Budget: | 500,000.00 |

|  |  | 16) Return |
|---|---|---|
|  | 6) Add |  |
|  | 8) Delete |  |
| 5) Next / Last | 9) Modify |  |

DISPLAY SCREEN 402

| SELECT Employee Department Info | |
|---|---|
| LOW – Specify Equal, Generic or Low Range values. | |
| Enter selection criteria and press a Function Key listed below. | |
| Press (↑7) for options. | |
| Last Name: | ? ......... |
| First Name: | ? ......... |
| Extension: | ? ... |
| Hire Date: | ? ....... |
| Salary: | ? .......... |
| Reporting Dept: | ? .............. |
| Reporting Dept Location: | ? |
| Reporting Dept Budget | ? |
| On Loan Dept: | ? .............. |
| On Loan Dept Location: | ? |
| On Loan Dept Budget: | ? |

| ENTER) List | 1) Clear | 16) Return |
|---|---|---|
|  | 6) Add |  |
| 3) Down | 7) High-Low / Options |  |
|  | 8) Delete |  |
|  | 9) Modify |  |

SELECT SCREEN 404

FIG. 12

| ADD Employee Department Info | |
|---|---|
| Please fill in the requested information and press (ENTER) to Add the record, or press another Function Key listed below. | |
| Last Name: | .......... |
| First Name: | ........... |
| Extension: | ... |
| Hire Date: | ....... |
| Salary: | 0.00....... |
| Reporting Dept: | ............. |
| Reporting Dept Location: | |
| Reporting Dept Budget: | 0.00 |
| On Loan Dept: | ............. |
| On Loan Dept Location: | |
| On Loan Dept Budget: | 0.00 |
| ENTER) Add        7) Set Defaults | 16) Return |

406-2  406-1

| MODIFY Employee Department Info | |
|---|---|
| Please modify the displayed information and press (ENTER) to modify the record, or press a Function Key listed below. | |
| Last Name: | HORNE ..... |
| First Name: | GLENN ..... |
| Extension: | 4400 |
| Hire Date: | 02/22/77 |
| Salary: | 22,250.00·· |
| Reporting Dept: | MIDWEST ......... |
| Reporting Dept Location: | CHICAGO |
| Reporting Dept Budget: | 400,000.00 |
| On Loan Dept: | SALES .......... |
| On Loan Dept Location: | LOWELL |
| On Loan Dept Budget: | 500,000.00 |
| ENTER) Modify     1) Skip record | 16) Return |

406-3

| DELETE Employee Department Info | |
|---|---|
| Please press (ENTER) to delete this record, or press a Function Key listed below | |
| Last Name: | HORNE |
| First Name: | GLENN |
| Extension: | 4400 |
| Hire Date: | 02/22/77 |
| Salary: | 22,250.00 |
| Reporting Dept: | MIDWEST |
| Reporting Dept Location: | CHICAGO |
| Reporting Dept Budget: | 400,000.00 |
| On Loan Dept: | SALES |
| On Loan Dept Location: | LOWELL |
| On Loan Dept Budget: | 500,000.00 |
| ENTER) Delete     1) Skip record | 16) Return |

FIG. 13

```
PACE DATA DESCRIPTION FACILITY xx.xx.xx

PLEASE MARK ENTRY (S) AND SELECT AND PRESS A PF KEY

TABLE              COMMENT

#  Customer      Records of current customers
     #  Item          Records of items currently on order
     #  Order         Records of outstanding orders to customers
     #  Part          Records of parts in inventory ENTER) Fields in Table
   1) Advanced Functions
              6) Add            9) Modify              13) Help
              7) Find          10) Display Table
              8) Delete        11) Keys for Table      16) Return
```

FIG. 18

ADD TABLE

Please enter the information and press the appropriate PF key below:

Table Name = ************************
Comments = ********************************************
           ********************************************
           ********************************************

ENTER) Add entry
1) Return                           10) Pick File              16) Cancel Add 3) Down

FIG. 19

ADVANCED LIST PACE DATA DESCRIPTION FACILITY xx.xx.xx

PLEASE MARK ENTRY(S) AND SELECT AND PRESS A PF KEY

| TABLE | COMMENT |
|---|---|
| # Customer | Records of current customers |
| # Item | Records of Items currently on order |
| # Order | Records of outstanding orders to customers |
| # Part | Records of parts in inventory |

ENTER) Display

6) Create Relationship   9) View Relationship   13) Basic Functions

8) Delete Relationship   16) Return

FIG. 20

INTERACTIVE CONSTRUCTION OF MEANS FOR DATABASE MAINTENANCE

This is a continuation of co-pending application Ser. No. 07/040,702 filed on 04/17/88, now abandoned, which is a continuation of Ser. No. 06/690,844 filed on 01/11/85, now abandoned, which is a continuation-in-part of U.S. Ser. No. 687,809, filed Dec. 31, 1984, now abandoned.

This application is filed with a microfiche appendix comprising 9 fiche and 439 frames.

My invention relates to the operation of data processing systems, in particular to means for the management of relational databases stored in the memory of such systems. The invention further relates to means to facilitate the interactive use and updating of such databases.

BACKGROUND OF THE INVENTION

My invention is employed in a data processing system having one or more terminals or consoles which provide display means and input signal means such as a keyboard, and providing in storage physical records modeled as one or more relational databases.

Among the individual ultimate users of the data processing system and database are some users, such as clerks and managers, who are not programmers. Such users wish to be able to use the system terminals to view representations of the records stored in the database, to select specific records or parts of records to view, to delete or modify physical records in the database, or to add new physical records to the database. For these purposes the physical records must be selected, accessed in the physical storage, and retrieved (copied), and representations of the retrieved records must be displayed to the user at one of the terminals in some predetermined display format.

To permit this use of the stored database, there must be provided in the data processing system stored coded instruction signals which when used to control the data processing system cause representations of the physical records, as well as representations of signals input by the user through the keyboard, to be displayed in a particular format on the display. Further, there must be provided instruction signals which when used to control the data processing system cause the interpretation of the signals input by the user, and which cause the retrieval and modification of the physical records of the stored database in response to such input signals.

Such instructions, designed for a particular use of a particular database, together comprise one of a class of programs known as "database application programs", that is, programs used by the ultimate user of the data processing system to carry out the application desired by him on a particular stored physical database.

The preparation of such applications programs has typically required weeks or months of effort by an application programmer, followed by additional weeks to detect and eliminate errors in the program so that it becomes reliable and relatively error-free in use.

It is therefore desirable to provide means for simplifying the construction and operation of such database applications programs, and it is an object of my invention to provide such means.

As is well understood in the art, the user (or programmer) of a data processing system does not deal directly with the physical records stored in the system's memory. Rather, he deals with a model of such records, provided when needed by means of programming stored in the system's memory and executed by the processor as needed. Referring to FIG. 2, the physical records are stored on physical media, advantageously as magnetic signals stored on magnetic disks 24 comprising secondary memory 16. The magnetic signals are physically organized on disks 24 in a manner well understood in the art of managing such memory media. The particular organization of such signals, and the particular means of locating them and copying them into main memory 14, are highly dependent on the hardware aspects of the particular memory media employed.

Several models of the records are provided, having different degrees of abstraction from the underlying stored physical records. Briefly, these are (referring to FIG. 2): the "external" view (26 or 28), in which "external" or "logical" records are seen by a particular user; the "conceptual view" (30), in which "conceptual" records are seen, each external view being a subset of the conceptual view; and the "internal" view (32) in which "internal" or "stored" records are seen.

It will be recognized that, when the data processing system operates to construct and present for use the records of each view shown in FIG. 2, these records are at that time (during such use) represented within the data processing system by physical signals derived from the magnetic signals stored on disks 24. When such use is concluded, the constructed records are no longer physically represented within system 10. In contrast, the underlying physical records stored on disks 24 remain on the disks at all times, whether or not they are in use, until deleted or modified.

The signals representing the records as seen in the various views 26, 28, 30, and 32 are derived from the physical records stored on media 24 by the data processing system, by means of the operation of a database management system, in other words by the execution of a suitable stored program by processor 12. As seen in the conceptual showing of FIG. 3, the physical records on media 24 are physically written, copied, and deleted by the data processing system under the control of a program element known as an access method, in a manner well understood in the art, and forming no part of the present invention. The access method is regarded as presenting to the database management system "stored" or "internal" records corresponding to and derived from the physical records.

The "internal" view is not seen by the user of the database (although it may be known to a programmer using the system). Processor 12, operating according to other portions of the database management system program, constructs from the stored or internal records the records of the conceptual view and its subsets, the external views. The definitions of the conceptual records are independent of the storage structure or the strategy employed by the access method for efficiently locating and retrieving the physical records.

Records in a database may be related to other records in the database, and the relationship is of interest to the user of the database. The relationship is itself represented as an entity in the database.

It is well understood in the database management art that the conceptual records of a database, and the relationships among them, may be organized or modeled in one of three possible ways, known as relational, hierarchical, and network models.

The present invention relates to the management of the records of a database modeled as a relational database.

The records of a relational database are conceptually organized as tables (also referred to as "relations". Referring to FIG. 4, a table (relation) of a relational database comprises a plurality of rows; each row is a record (or tuple) comprising a plurality of fields. All rows of a particular table have the same number of fields. The fields of the records are arranged in columns; a column is also referred to as an attribute. The elements of a column are all members of a class of such elements, referred to as a domain, and the column is named by a column heading (domain name). Each record includes one or more fields whose content is an index or key, to be used in uniquely identifying the record.

A crucial feature of relational data structure is that associations between rows (tuples) are represented solely by data values in columns drawn from a common domain, rather than in terms of the physical location on disk of the related records.

Relational databases have various advantages over the two alternative models. Generally speaking, while hierarchical and network databases are organized to make it efficient to deal with one record at a time and to obtain a single related record at a time, relational databases are organized to make it efficient to deal with a set of records at a time and to obtain a set of related records at a time.

It is an important aspect of the relational model that the tables (relations), if they conform with certain constraints, may be considered as mathematical elements, also called relations, as to which a rigorous mathematical treatment already exists. Hence, operations on the tables can be analyzed in terms of this mathematical theory, an advantage in clearly understanding the effects of such operations. In particular, representing the data in the form of uniformly defined sets makes possible a corresponding uniformity in the set of operators which transform the sets, which simplifies the task of providing program elements for controlling a data processing system to transform such sets. It is an object of my invention to extend this advantage to aspects of database maintenance where it has not previously been provided, by providing an enumerated relation.

There may be (and typically are) many databases stored in the data processing system, containing physical records representing information of various kinds. For example, there may be a personnel database containing information on employees, such as their names, departments, salaries, skills, employment history, and the like, with related information about the departments in which the employees work. There may be a sales database containing information about the company's customers and their orders to the company, with dates, prices, and payment history; there may be a procurement database containing information about the company's suppliers and the items supplied by them, with quantities and information about their use in products.

For each such database, there may be several distinct users; each user may be concerned with only a portion of the information in the particular database.

Generally speaking, several distinct application programs must be provided to enable such users to access and use each database. Each additional database generally requires a further plurality of distinct application programs. Creation of an application program typically requires weeks or months of effort by a professional applications programmer, followed by additional weeks to detect and eliminate errors in the program so that it becomes reliable and relatively error-free in use.

It will be evident that the provision of the applications programs is a significant element in the cost of maintaining a database. It would therefore be desirable to provide means for creating such programs in a simple, rapid and inexpensive manner.

Furthermore, when such programs are created by professional programmers who will not themselves be the ultimate users of the program and the database, frequently the programmers have an imperfect understanding of the purposes of the ultimate users, and the resultant application program is not as well suited to the user's needs as could be wished. It would be desirable to permit the users themselves to create the application program, which could then be closely fitted to their purposes. Since most such users are not programmers, this has not hitherto been easy to accomplish.

A particularly burdensome and time-consuming aspect of the creation of such application programs has been the provision of means permitting the user of the database to make a transition from viewing members of a particular set of record occurrences to viewing members of a related set of record occurrences. (The nature of the relationship is explained in more detail herein.) This transition is one which is frequently desired in an application program. It would be desirable to provide simple and economical means permitting such transitions.

It is therefore an object of my invention to provide means for creating such application programs in a simple, rapid and inexpensive manner, interactively and nonprocedurally. It is a further object to provide means for permitting the database users themselves to create the application program. It is another object to provide in such an application program simple and economical means permitting the user of the database to make a transition from viewing members of a first set of records to viewing members of a related set of records.

BRIEF DESCRIPTION OF THE INVENTION

My invention is employed in a data processing system having input means for providing input signals; a visual display; storage means providing working storage and database storage; and a processor having means for controlling the visual display, means for reading and writing the storage means, means for responding to the input signals, and access means for retrieving record occurrence signals from the database storage and for storing retrieved record occurrence signals in the working storage.

According to my invention, the data processing system is characterised in having means in the working storage for providing format signals representative of a predefined display format data structure, and means in the database storage for providing description signals representative of a description data structure describing a data dictionary for describing the elements of a relational database; the description data structure is modeled as relations in a relational database.

The data processing system further has interactive and nonprocedural data dictionary defining means for controlling the display to display elements comprising representations of record occurrences retrieved from the description data structure signals and representations of selectable operations, in a format derived from the display format data structure signals; for accepting from the input means, input signals representing element enumeration, characters, and operation selection; and for allocating storage with the database storage and placing therein signals representative of a data dictionary data structure responsive to the description data structure and to the input signals. The data dictionary data structure is modeled as relations in a relational database and is descriptive of a particular other relational database.

In preferred embodiments, the working storage further provides cursor signals representative of a cursor defined against a target comprising at least one of the relations in the description data structure, and the data dictionary defining means comprises relational operator means, as described in my copending application.

According to a further aspect of my invention, the data processing system is further characterized in having means in the working storage for providing signals representative of a predefined second display format data structure and a predefined archetype display format data structure. The system further has interactive and nonprocedural screen-file defining means for controlling the display to display elements comprising representations of record occurrences retrieved from the data dictionary signals and representations of selectable operations, in a format derived from the second display format data structure signals; for accepting from the input means, further input signals representing element enumeration, characters, and operation selection; and for allocating storage within the working storage and placing therein signals representative of a screen-file data structure responsive to the data dictionary signals, the archetype display format signals, and the further input signals. The screen-file data structure comprises predefined format signals representative of formats for the display of record occurrences retrieved from the particular other database.

According to a further aspect of my invention, the database storage further provides signals representative of the record occurrences comprising the particular other relational database. The data processing system is further characterized in having interactive and nonprocedural means for maintaining the particular relational database, comprising the signals representative of the screen-file data structure constructed by the screen-file defining means, and relational operator means as described in my copending application.

Other objects, features and advantages will appear from the following description of a preferred embodiment of my invention, together with the drawing, in which:

BRIEF DESCRIPTION OF THE DRAWING

FIGS. 7a and b show a particular screen format employed in my invention, and the same format merged with representations of record occurrences from the database to define a screen image;

FIGS. 12 and 13 show certain screen formats in greater detail;

FIGS. 18, 19, 20 and 21 show in detail certain screen formats;

DETAILED DESCRIPTION OF THE INVENTION

Data processing system generally

Figure 1:
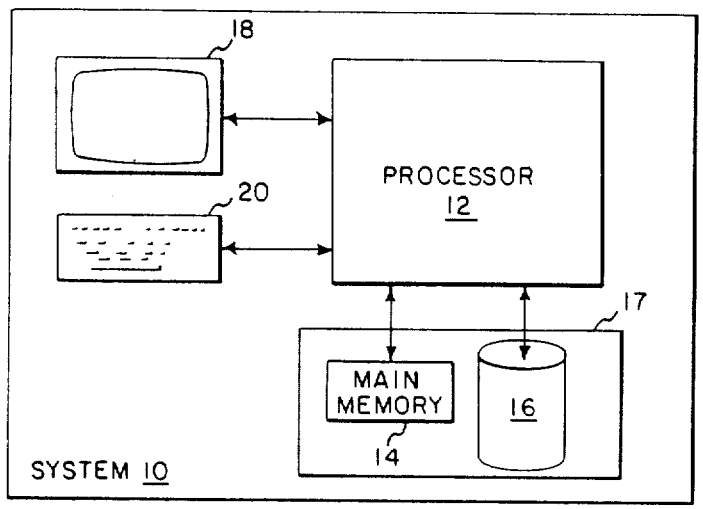
FIG. 1 is a simplified block diagram of a data processing system in which my invention is employed.

Referring now to the drawing, and in particular to FIG. 1, the data processing system 10 has a processor 12, having a main memory 14. Secondary memory 16 is provided in the form of one or more disks. Main memory 14 and secondary memory 16 together comprise storage 17. The description of the present invention does not concern itself with details of moving signals representing portions of programs or data between main memory and secondary memory, as that is well understood in the art of managing data processing systems and the present invention does not pertain to it. It is assumed that signals in all parts of storage 17 are available to processor 12.

One or more terminals or consoles, connected to processor 12, each provides a CRT screen as a display means 18 and a keyboard as signal input means 20. Other signal input means, such as mice, touch screen, voice actuation, and the like, are contemplated by my invention. If my invention is practiced in a large data processing system, there may be additional processors within the system, such as input/output processors, and the operations referred to herein as performed by the "processor" may in fact be divided among such processors. Such details do not affect the scope of the invention.

Keyboard and PF keys

Figure 5:
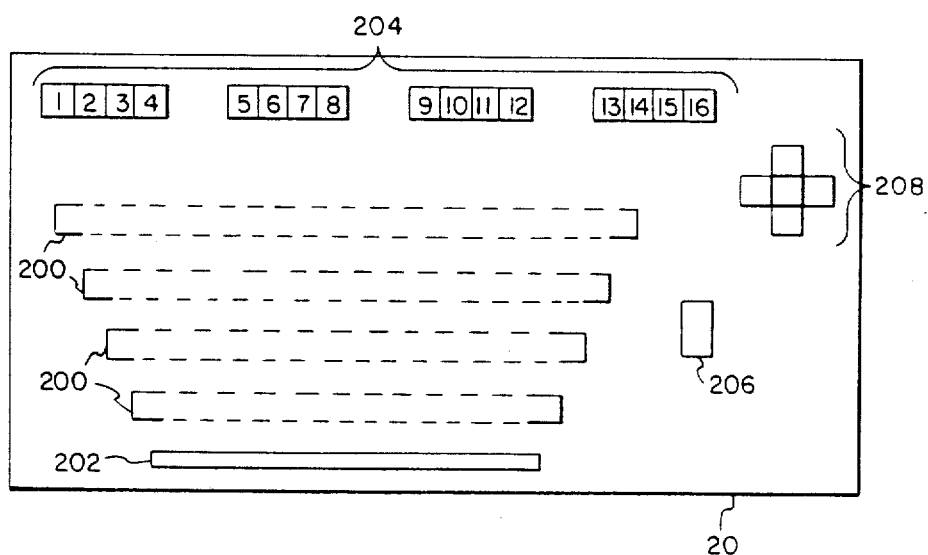
FIG. 5 shows the keyboard of the data processing system of FIG. 1.

Referring now to FIG. 5, keyboard 20 provides the usual keys of a typewriter keyboard, indicated generally at 200, with space bar 202. At the top of keyboard 20 are 16 keys 204, arranged in groups of four; these are called PF (programmed function) keys. Each is assigned a number from one to sixteen, and displays its assigned number. With the use of the shift key, these keys provide thirty-two possible programmed functions. In addition keyboard 20 provides an Enter key 206 and a pad of screen-position-marker control keys 208. (The screen-position-marker is more usually called a "cursor", but that term will not be used for this element in the present description, in order to avoid confusion with the "cursor" used in fetching multiple records from a relational database.)

Storage 17

In the description which follows, the convention is observed that words begining with "@" are names of pointers to data structures or to elements within storage 17; that words beginning with "$" are names of parameters for particular program elements; and that words ending with "#" are names of indexes to elements within lists or sets in data structures. Elements within a data structure are named by words beginning with the data structure name (or an abbreviation thereof), followed by a period: e.g. "qry.source" is a storage element (or in some cases the signals stored in such storage element) named "source" and located within data structure "QUERY". Words beginning with "DO" are names of modules within the calling program; words beginning with "WZ" are names of external procedures called by the calling program.

Storage 17 of data processing system 10 is regarded conceptually as divided into program storage and data storage.

The contents of program storage (shown in FIG. 16) will first be briefly reviewed; the contents of the data storage (shown in FIG. 6) will be described; each module of FIG. 16. will then be described in more detail; and the operation of data processing system 10 with respect to the data structures and according to the modules will then be described.

Program storage

Figure 16:
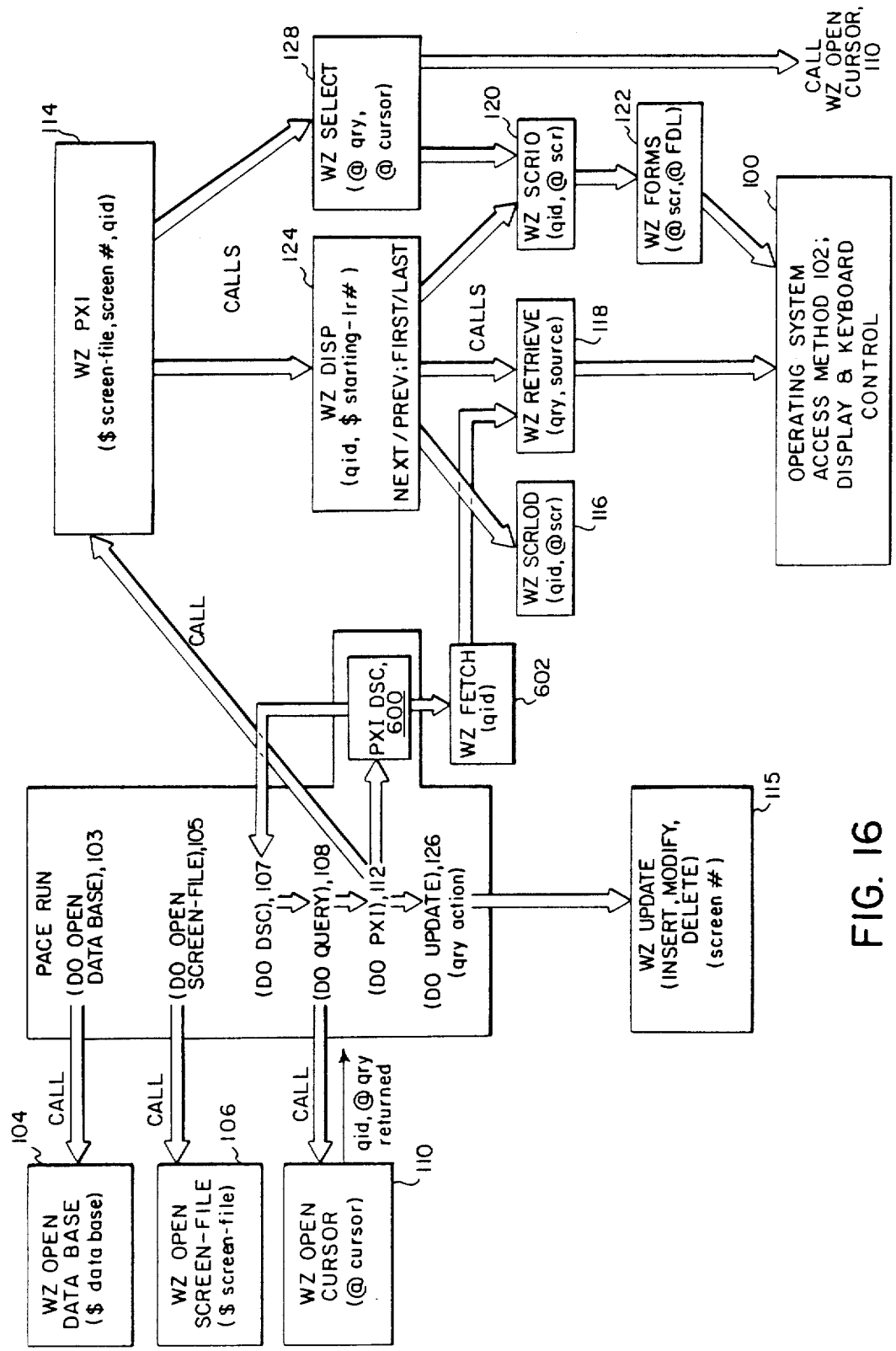
FIG. 16 shows the allocation of part of the program storage portion of the storage of the data processing system of FIG. 1.

Referring now to FIG. 16, the program modules provided in program storage are shown conceptually, with an indication of the significant parameters input to each module and an indication of calls from one module to another. In addition, in certain cases parameters returned by the modules are indicated.

It will be readily understood that such modules and parameters are represented by physical signals, and that during operation, processor 12 copies from program storage signals representing appropriate program elements and uses such signals to control the physical state of hardware elements within system 10 so that the represented operation is physically carried out. It will be likewise understood that when a module is described as "calling" another module, in fact data processing system 10, operating according to the first module, accesses the second module and copies its signals in order to control further operation according to the second module.

Brief description of program storage

Operating system. In the program storage portion of storage 17 there are provided signals representing an operating system program 100, which forms no part of the invention and may be of any desired design, but which must provide an access method 102 suitable for controlling data processing system 10 to retrieve record occurrences from the database in storage 17, to modify or delete record occurrences in the database, and to add new records to the database. In addition, operating system 100 must include program for the control of display 18 and keyboard 20, and specifically, must be able to respond to an appropriate command ("Write/Read Screen") in a calling program by sending signal representing a stored screen image to display 20, receiving keyboard input signals, modifying the stored screen image in accordance therewith, and in addition storing certain of the keyboard input signals.

Figure 17:
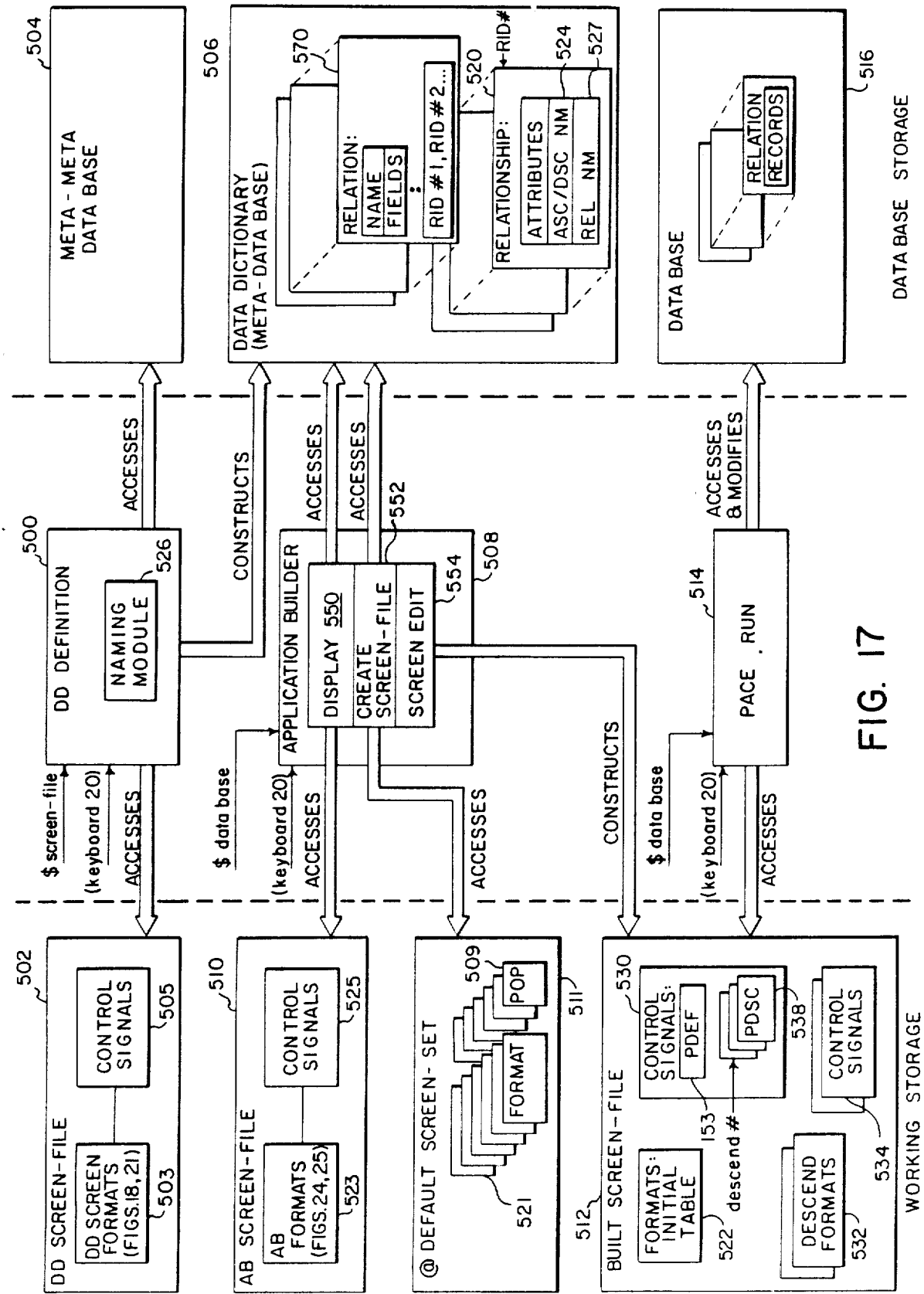
FIG. 17 is a conceptual showing of operations performed by the data processing system of FIG. 1, under the control of particular signals stored in the program storage, with respect to the signals in the data storage of the system.

Calling program. Program storage 17 further provides signals representing a "calling program" which calls programming elements for the operation of the data processing system. In the embodiment described herein, the calling program is titled PACE RUN, but other programs may also be calling programs if they provide means for accomplishing the calling functions generally in the manner described for PACE RUN. In particular, the DD Definition program module 500 and the Application Builder program module 508 of FIG. 17 are also calling programs. The details of such programs are not pertinent to the present invention except as described herein.

The information which must initially be passed from the user of the terminal to the calling program comprises a designation of the database to be accessed, a designation of the screen file to be accessed, and in some cases a cursor. (In other cases, a cursor is provided in a manner to be explained). As understood in the art of managing relational databases, a cursor is a statement (or an implementation-dependent data structure derived from such statement) which defines a set of record occurrences to be retrieved from the physical database, and which identifies a position within the set during the process of retrieving the record occurrences.

Within the calling program (PACE RUN) are provided a DO OPEN DATABASE module 103, a DO OPEN SCREEN FILE module 105, a DO DSC module 107, a DO QUERY module 108, a DO PXI module 112, and a DO UPDATE module 126.

A WZOPEN DATABASE module 104 is called by module 103; a WZOPEN SCREEN FILE module 106 is called by module 105; and a WZOPEN CURSOR module 110 is called by DO QUERY module 108. A WZPXI module 114 is called by DOPXI module 112, and the WZDISP module 124 is called by WZPXI module 114. The modules WZSCRLOD 116, WZRETRIEVE 118 and WZSCRIO 120 are called by WZDISP module 124. WZFORMS 122 is called by WZSCRIO 120. Further, a WZSELECT module 128 is called by module 114, and calls both WZSCRIO module 120 and OPEN CURSOR module 110. A DO UPDATE module 126 is also called by DOPXI, under conditions to be described, and the WZINSERT, WZMODIFY, and WZDELETE modules 115 are called by module 126. Details of the program modules shown in FIG. 16 and of the operation of data processing system 10 under the control of signals representing them will be described in what follows.

Data storage

Figure 6:
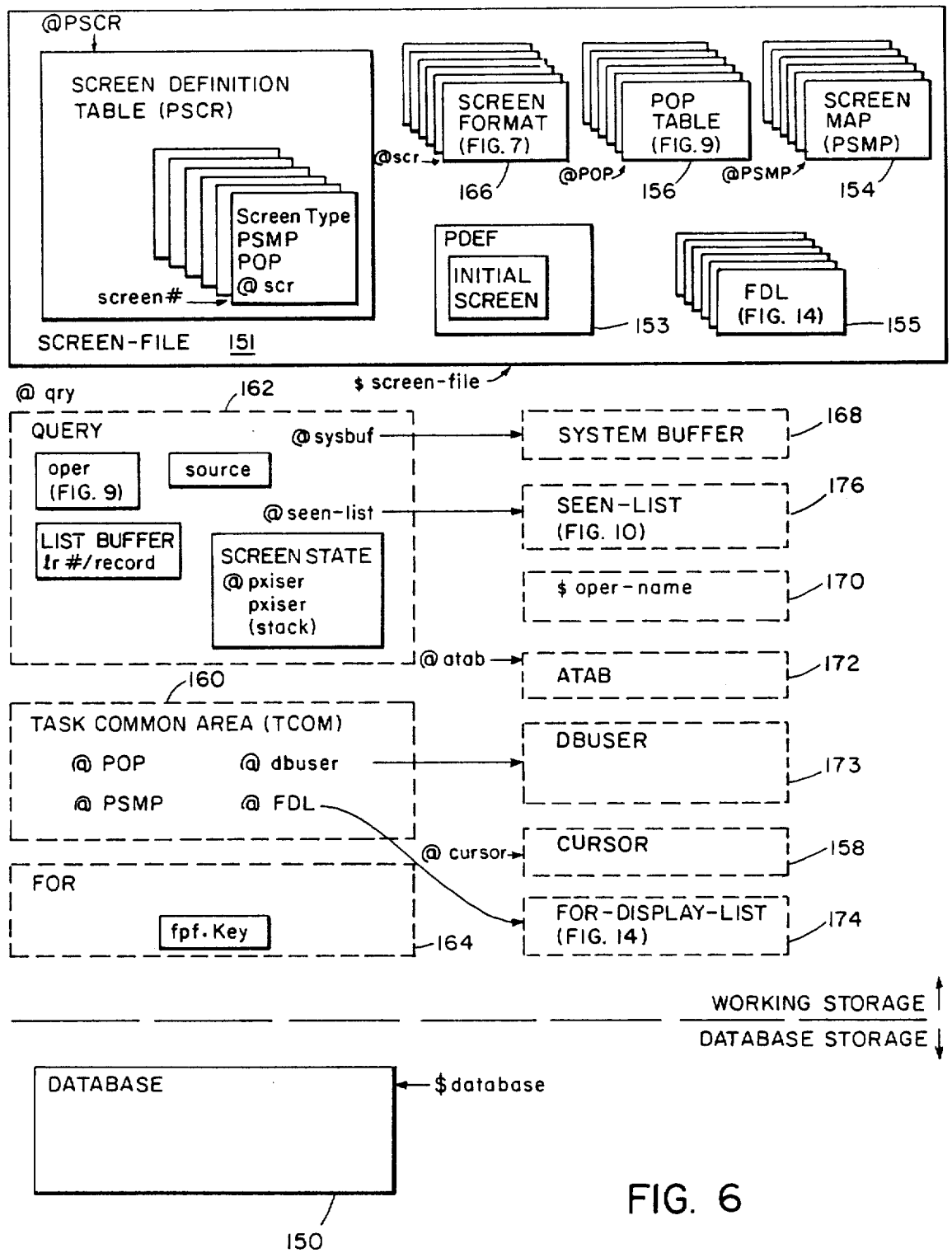
FIG. 6 is a conceptual showing of the allocation of data storage in the data processing system.

Referring now to FIG. 6, the data storage portion of storage 17 is conceptually divided into the database storage means providing signals representing the record occurrences comprising one or more relational databases 150, and working storage. The details of the database storage, as has been explained, are not visible to the user of data processing system 10, and will not be further described.

The working storage is shown as providing signals representing two kinds of data structures; the signals representing those shown in solid lines are provided in storage 17 before operation begins; signals representing the structures shown in dotted lines are placed into storage, or storage space is allocated for them, during the operation of data processing system 10 according to the program elements shown in FIG. 16, as will be described.

Screen-file 151: PSCR, PSMP, POP, and PDEF

Signals representing a screen-file data structure 151 are provided in storage 17, and provide predefined display format signals. Screen-file 151 may be part of the user (calling) program. It may provide display format signals for more than one target relation; for purposes of this description, however, it will be assumed that it is designed for the display of record occurrences from a particular target relation (base table or view) within the named database. More than one screen-file may be provided, if more than one target relation is to be accessed.

Screen file 151 includes a PDEF table 153, which provides storage for signals representing the initial screen format to be accessed. Screen file 151 further includes Procedure Screen Definition Table (PSCR) 152; the element @pscr is a pointer which addresses PSCR 152. PSCR 152 provides stored signals relating to a plurality of screen formats, the signals for each screen being located by the screen index (screen#). For each screen there are provided in PSCR 152 signals representing the screen type (or mode indicator), a pointer @scr which points to a screen format 166 (to be described below in connection with FIGS. 7, 11 and 12), and the names of a Procedure Screen Map (PSMP) and a Procedure Operator Table (POP) associated with the screen.

Screen file 151 further provides, for each screen indexed in PSCR 152, signals representing a screen format 166, a POP table 156, a PSMP 154, and a portion 155 of the For-Display-List.

Figure 9:
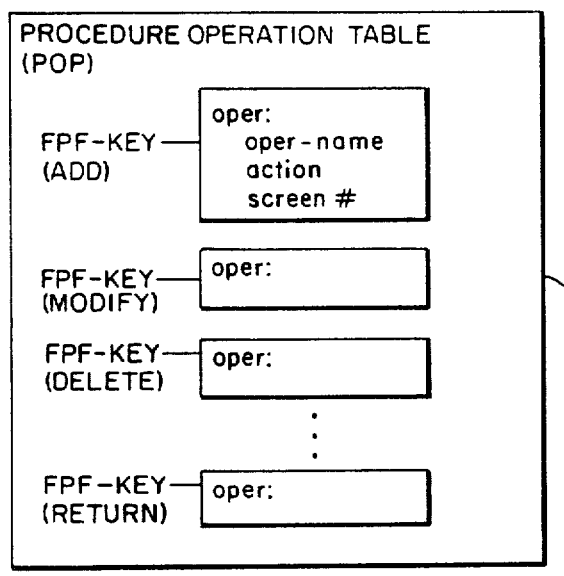
FIGS. 9 and 10 are conceptual showings of portions of FIG. 6 in more detail.

The POP table 156 for a particular screen format 166 is shown in more detail in FIG. 9. POP table 156 provides, for each screen format 166, signals representing information about the operations that may be selected from keyboard 20 while such screen is displayed; these include operations to be performed on the result relation interactively defined during display of that screen format as well as other operations such as scrolling of record occurrence representations and transitions to certain other screen formats. The table is indexed by the value of a storage element called FPFkey, to be described, and for each such value, a data structure called "oper" is provided, giving information regarding the operation which is selectable by means of a PF key on keyboard 20 in a manner to be explained. "Oper" includes the "oper-name" (text to be returned to the calling program), the action (or actions) to be taken, and the screen name of the screen format to be used for the action, when pertinent. In the POP table for the LIST screen, there is an "oper" for each of the operations Add, Modify, Delete, and Return. Other screens may have POP tables containing opers for more or fewer operations. Other operations may also be provided when the POP table is designed.

The Procedure Screen Map (PSMP) 154 for a particular screen format 166 contains signals representing a list of the names of view-fields that are to appear on the display when the screen format is used to display record occurrences from the database. This information is used when filling out the For-Display-List 155/174. Further, PSMP 154 for a particular screen format 166 provides a screen limit signal, defining how many record occurrences can be displayed at one time on such screen.

Screen formats

Figures 11, 14:
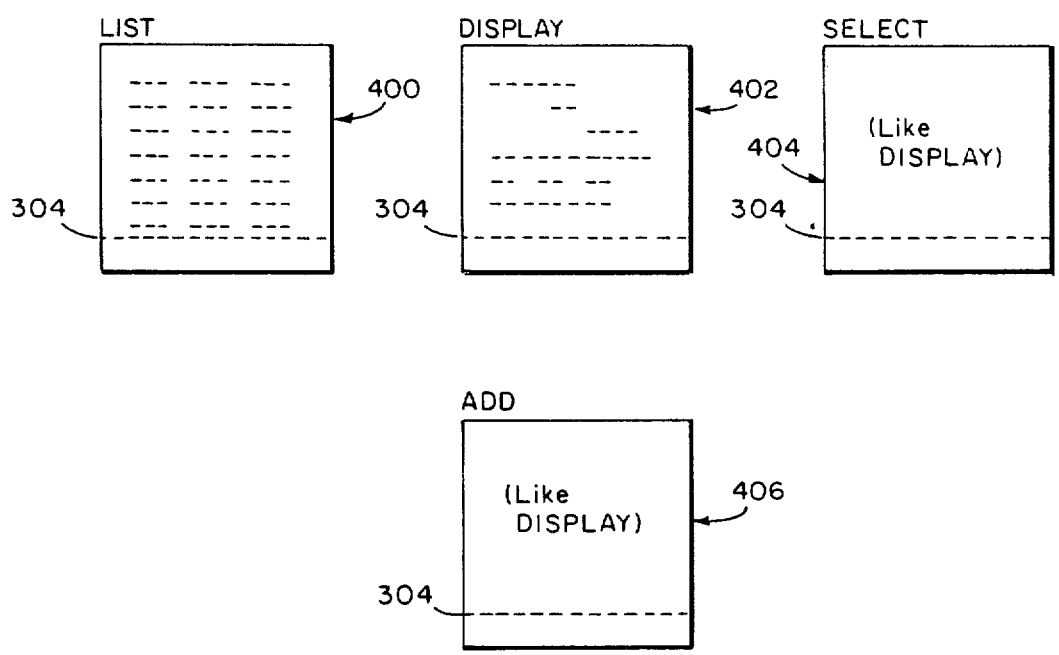
FIG. 11 shows simplified views of the types of screen format employed in my invention.
FIG. 14 shows a portion of FIG. 6 in more detail.

Referring now to FIG. 11, each screen-file may contain signals representing up to six screen formats (shown together as formats 166 in FIG. 6); however, there are only two basic types. The formats are shown schematically in FIG. 11 so that the differences between the two types can be easily seen. The LIST screen format 400 is adapted to show representations of many record occurrences from the database target relation, and therefore provides spaces for the fields of such occurrences, arranged in columns. Fewer than all fields may be shown. The DISPLAY screen format 402 is adapted to show a representation of a single record occurrence from the database target relation, and can show more of the fields of that record occurrence. The formats of the SELECT screen (404) and the ADD, MODIFY, and DELETE screens (406) are basically similar to the formats of the DISPLAY screen, in that representations of the fields of a single record, or of the names of the fields of a single record, are shown, with differences to be described.

LIST screen format

LIST screen format 400 is shown in FIGS. 7a and b in greater detail.

FIG. 7a shows LIST screen format 400 as initially provided in screen-file 151. The title 300 of the screen is provided, with the name of the target relation at 310 and fixed text at 302. Below the fixed text are column headers and empty spaces for the display of record occurrences. A line 304 divides the screen into upper and lower portions 306 and 308. Below line 304, in lower portion 308, are displayed the numbers of particular PF keys among the sixteen keys 204 of keyboard 20 (FIG. 5), together with the name of ENTER key 206 on keyboard 20. Names of selectable operations are represented in association with the key designations.

It will be observed that not all of the sixteen possible PF keys are listed in lower portion 308 of the screen format; this is because only a smaller number of operations are selectable while the LIST screen is displayed. Among those listed is PF key 204-16: Return. Actuation of Key 204-4: Prev causes a previously displayed screenload of record occurrences in the list to be redisplayed, still using the present format; actuation of key 204-4 with the shift key causes the first screenload of record occurrences in the list to be displayed. Actuation of key 204-5 similarly causes the next screenload to be displayed, and actuation of key 205-5 with the shift key causes the last screenload of occurrences to be displayed. Keys 204-4 and 204-5 thus scroll portion 306. Actuation of key 204-7 causes SELECT screen format (described below) to be displayed. Actuation of keys 204-8 and 204-9 cause one or more of the displayed record occurrences, selected by the user by moving the screen-position-marker, to be displayed in the DELETE and MODIFY screen formats, to be described. (If more than one record occurrence has been selected, they will be displayed sequentially on the selected screen.) Actuation of key 204-6 causes and ADD screen format (described below) to be displayed. Actuation of ENTER key 206 (on keyboard 20, FIG. 5) causes a transition to the DISPLAY screen format, in which an enumerated record occurrence is represented.

The displayed key identifiers including PF key numbers and key names, with corresponding operation names, provide representations of a plurality of selectable operations, including executable with respect to the members of the result relation to be provided by the relational operator means, as will be described.

In FIG. 7b, the retrieved record occurrences are represented below the column headers.

Other formats

Referring now to FIGS. 12 and 13, the remaining screen formats are shown in more detail than in FIG. 11.

FIG. 12 shows DISPLAY screen format 402, with representations of the fields of a single record occurrence. This screen format is shown in response to actuation of ENTER key 206 (on keyboard 20, FIG. 5) while the LIST format is displayed. The names of the fields in the record are given to the left of the values of the fields. Selectable operations are displayed in lower portion 308 of the format. Actuation of PF key 204-16 (Return) causes a return to a view of the LIST screen format. Actuation of PF keys 204-6 (Add), 204-8 (Delete), and 204-9 (Modify) permits the user to view the same record occurrence that is displayed in the DISPLAY screen format, but displayed in one of formats 406, so that the indicated operation can be performed.

SELECT screen format 404, which is shown in response to actuation of PF key 204-7 while the LIST format is displayed, is similar in arrangement to format 402, but the values of some or all of the fields are represented by question marks and blanks. This screen permits the user to position the screen-position-marker at a particular field (open element) and to enter a characterizing value into the field, for the purpose of selecting from the target relation (named at 310) in the database, record occurrence which have that value in the selected field. More than one field may be so characterized.

Referring now to FIG. 13, the Update screen formats 406 are shown. ADD screen format 406-1 is similar to the SELECT screen format, but in this case, the user must fill in all the fields necessary to constitute a new record occurrence to be added to the target relation (named at 310) of the database. MODIFY screen format 406-1 is similar to DISPLAY format 402, but the representations of the values of the fields are shown highlighted (or otherwise distinguished from the attribute names), to indicate that the user can modify these values, for the purpose of modifying in the database the record occurrence represented on the screen. DELETE screen format 406-3 is again similar to DISPLAY format 402, but the selectable operations include "Delete" or "Skip record".

Cursor 158

Referring again to FIG. 6, signals representing a cursor are provided in storage at 158, with a pointer @cursor. The particular cursor represented in storage element 158 may be either provided by the calling program or derived from an initial cursor in a manner to be described, or otherwise defined. As previously stated, a cursor is a statement (or an implementation-dependent data structure derived from such statement) which defines a set of records to be retrieved from a target relation in the database, and which identifies a position within the set during the process of retrieving the records.

Other data structures

Still referring to FIG. 6, storage for the data structures Task Common Area (TCOM) 160, QUERY 162, Seen-List 176, ATAB 172, For-Display-List (part two) 174, DBUSER 173, and FOR 164 is allocated during operation of data processing system 10, as will be described. In addition, storage for a System Buffer 168 is allocated during operation, as will be described.

Description of program modules and interaction with storage

Figure 2:
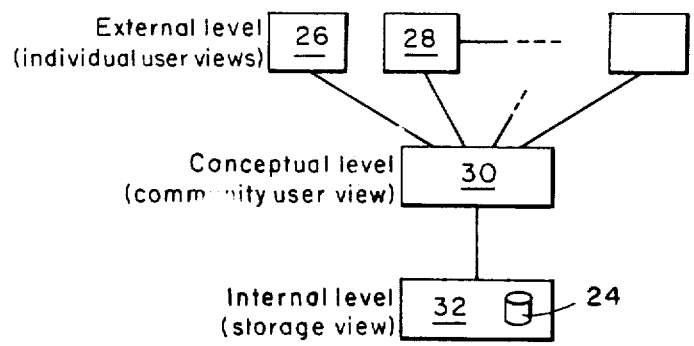
FIGS. 2 and 3 are conceptual diagrams showing the relationship between the physical records comprising the database, and the user of the data processing system.
Figure 3:
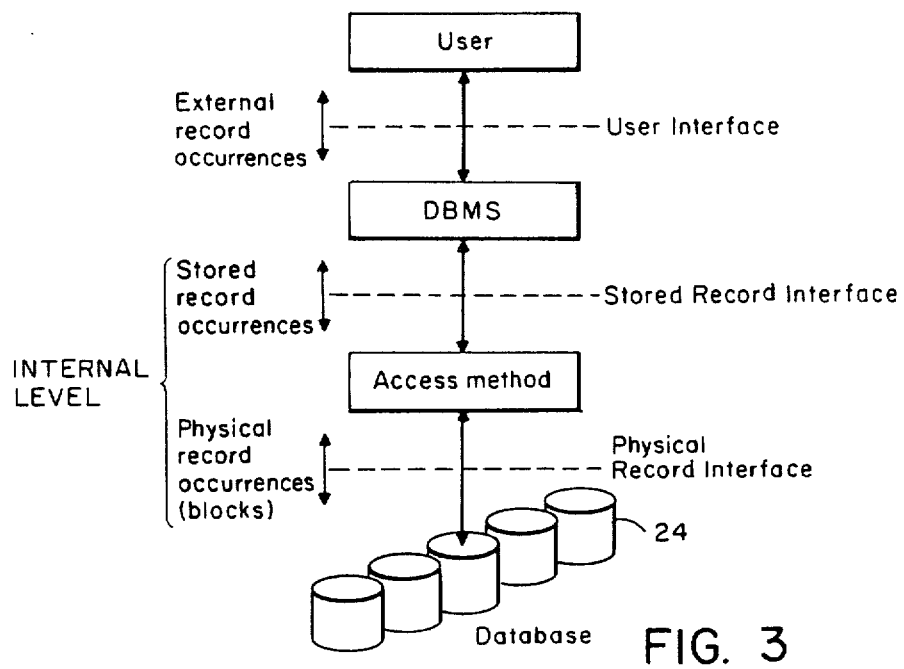
Figure 4:
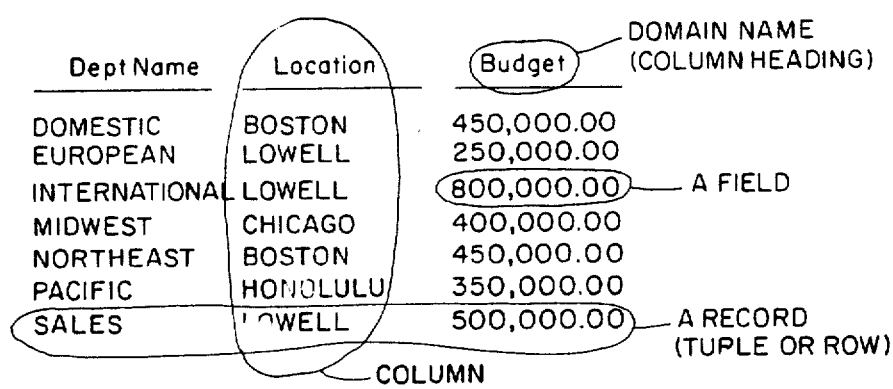
FIG. 4 shows the components of a typical relation of a relational database.

WZOPEN DATABASE 104. Data processing system 10 operates under control of signals representing program element WZOPEN DATABASE 104, called from the calling program, with respect to a particular database (named by the parameter $database). The information as to which database is to be accessed ultimately comes from the user of the data processing system terminal. Operating according to module 104, data processing system 10 allocates space in storage 17 for the data structure DBUSER 173, which provides signal representing pointers to list of descriptors of database records, files, relationships, and views, and other data pertinent to the opened database. Such descriptors provide signals for defining the conceptual records of level 30 (FIG. 2) in terms of the stored or internal record occurrences of level 32. Data processing system 10 then allocates in storage 17 space for signals representing the structure Task Common Area (TCOM) 160, which contains storage for various pointers to be used in subsequent operation, and in particular, contains storage for the pointer @for-display-list, which points to For-Display-List (part two) 174, and the pointer @dbuser, which points to DBUSER data structure 173.

Apart from the above, the procedure of opening a database so that record occurrences may be retrieved from it is well understood in the database management art and will not be particularly described herein.

WZOPEN SCREEN FILE 106. Data processing system 10 operates according to signals representing program element WZOPEN SCREEN FILE 106, called from the calling program, with respect to the parameter $screen-file (supplied ultimately by the user). The parameter $screen-file names the particular screen-file 151 to be accessed. If signals representing the particular screen-file referred to are not present in main memory 14, data processing system 10 loads signals representing PSCR 152 from secondary memory 16 at this time under the control of WZOPEN SCREEN FILE module 106; this operation forms no part of the invention.

DO DSC 107. Operating according to signals representing the DO DSC module 107 within the calling program, data processing system 10 defines an initial cursor, and places signals representing it in the data structure CURSOR 158 within storage 17. The cursor is defined against a target comprising at least one of the relations within the named database. The target may be either a base table (represented in storage by a distinct stored file) or a view (a view is a table relation that does not have any existence in its own right but is instead derived from one or more base tables.)

DO QUERY 108. The module DO QUERY 108 within the calling program for purposes of the present description serves only to control data processing system 10 to call WZOPEN CURSOR module 110 and DOPXI module 112.

OPEN CURSOR. The module WZOPEN CURSOR(@cursor, $qid) 110 is employed to control data processing system 10 to open the cursor defined by signals in data structure 158. The procedure of opening a cursor for the purpose of fetching multiple record occurrences defined by the cursor is in general well understood in the art of database management, and will not be described in detail herein.

In the particular embodiment described herein, data processing system 10 operating under the control of signals representing WZOPEN CURSOR module 110 allocates space within storage 17 for the QUERY data structure 162, corresponding to the cursor pointed to by @cursor. A single QUERY data structure corresponds to a single cursor. QUERY data structure 162 is pointed to by @qry, and contains signals representing the pointer @sysbuf, which points to System Buffer 168, pointer @pxiscr, which points to the screen format to be used during operation according to my relational operator or to the screen most recently used (to permit returns), pointer @seen-list, which points to Seen-List 176 (to be described), and others. Further, QUERY data structure 162 provides storage for a data element called "oper", a buffer called List-Buffer, and the data element "source", all of which will be described in what follows.

Data processing system 10 under control of WZOPEN CURSOR module 110 returns the identifier "qid" for the QUERY. Further operating under control of WZOPEN CURSOR module 110, data processing system 10 selects an access strategy to be used in retrieving physical record occurrences from database 150, as defined by the cursor; the process of selecting an access strategy is well understood in the database management art and will not be described herein.

DO PXI 112. Operating under the control of signals representing the module DO QUERY 108, data processing system 10 calls DOPXI(screen#) module 112, and after performing certain operations not pertinent herein, calls WZPXI($screen-file, screen#, $qid) module 114. "$screen-file" is a parameter which names the screen-file to be referred to; "screen#" is an index to the particular screen format within the screen-file. As stated in connection with Screen-File 151, the name of the initial screen to be accessed is provided by the calling program, and signals representing the name are stored in "initial-screen" within PDEF 153 in Screen-File 151. Names of screens accessed in subsequent operations are provided in a way to be described in what follows. As noted above, "qid" is the identifier for the QUERY. Operation according to WZPXI will be described below; it returns a value by placing signals representing such value within data structure ATAB 172 (FIG. 6). This value represents one of the operations Add, Modify, Delete, or Return; other operations may also be provided. In addition, WZPXI may return signals representing the characters of "oper-name" within the storage element 170 pointed to by $oper-name; this pointer is supplied by the calling program if desired. Either or both of the values in ATAB 172 and the characters comprising "oper-name" are available to the calling program for further testing; they may be used in different circumstances, not pertinent herein.

Upon return from WZPXI, data processing system 10 under the control of DOPXI tests the signals representing the value returned from WZPXI within data structure ATAB 172. For the actions Add, Modify, or Delete, data processing system 10 under control of DOPXI calls appropriate program modules (shown as DO UPDATE module 126 and WZINERT, DELETE, MODIFY module 115 called by module 126) in order to carry out the indicated operation.

WZPXI 114. Under the control of module WZPXI($screen-file, screen#, $qid) (114) data processing system 10 tests the signals representing the screen type (mode indicator) of the screen pointed to by "initial screen" in PDEF 153 (for the first iteration of WZPXI) or the screen type of the screen pointed to by qry.@pxiscr (for subsequent iterations).

Ignoring for the moment the possibility that the screen type is SELECT (which will be discussed below), if the screen type is either LIST or DISPLAY, module WZDISP 124 called. Operation according to WZDISP module 124 will be described below; during such operation, representations of one or more record occurrences defined by the cursor are displayed in either the DISPLAY (one occurrence) or the LIST (multiple occurrences) screen formats. When such operation is completed, signals have been placed in qry.oper representing an operation selected by actuation of a PF key by the terminal user.

When data processing system 10 returns from WZDISP module 124, operating further according to WZPXI module 114, it tests the signals stored in the storage element qry.action (within qry.oper). Certain actions (including a transition to a SELECT screen, discussed below) may be executed by data processing system 10 operating further according to WZPXI module 114; such operation includes resetting qry.@pxiscr and qry.pxiscr# to keep track of the transition. Otherwise, data processing system 10 operating further according to WZPXI module 114 copies signals representing qry.oper-name (within qry.oper) from QUERY data structure 162 to the location 170 pointed to by $oper-name, places signals representing the action into ATAB 172, sets qry.source to indicate either selection through the DISPLAY screen, selection through the LIST screen from the cursor, selection through the LIST screen by the marked screen list, or selection through the SELECT screen. The operation represented by signals in $oper-name and ATAB 172 may be Add, Modify, Delete, or Return. (The possibility that the operation is Select will be discussed below.)

WZDISP 124. Operating according to WZDISP module 124 with respect to the parameters $qid and $starting-lr# (lr#=list record number, stored in qry.List-Buffer; the starting-lr# is provided by WZPXI based on the screen state), data processing system 10 calls WZSCRLOD($qid, @scr) module 116 to complete the For-Display-List, as will be described, and then calls WZRETRIEVE(qry.source) module 118 to obtain a record occurrence to be displayed. Operation according to WZRETRIEVE will be described below. For the LIST screen, WZRETRIEVE is called repeatedly; record occurrences are retrieved one at a time until either a full screenload has been retrieved (as defined by the screen limit signal in the PSMP 154 for the screen), or there are no more record occurrences to be retrieved, that is, all those defined by the cursor have been retrieved. As each record occurrence is retrieved, signals representing its key are placed in Seen-List 176.

Upon return from WZRETRIEVE module 118, further operating according to WZDISP module 124, data processing system 10 calls WZSCRIO module 120 to cause representations of the retrieved record occurrences to be displayed. Operation according to WZSCRIO will be described below. Upon return from WZSCRIO module 120, data processing system 10 operating further according to WZDISP module 124 tests the signals stored in qry.action (within qry.oper).

If the action is a transition from DISPLAY to LIST format (selected by actuation of PF key 204-16: Return on DISPLAY format 402, FIG. 12) or from LIST to DISPLAY format (selected by actuation of ENTER key 206 on keyboard 20, LIST format, FIG. 7), data processing system 10 resets qry.@pxiscr and @scr to point to the new screen; the index qry.pxiscr# is used to keep track of transitions between screen formats. For such a transition operation, operating then further according to WZDISP and modules called therefrom, responsive to the screen-type of the screen format indicated by the reset pointers, data processing system 10 displays representations of the retrieved record occurrence or occurrences in the appropriate screen format.

If the action in qry.action is Next, Previous, First, or Last, the indicated scrolling operation is carried out by data processing system 10 while operating according to WZDISP module 124. Next or Previous causes the next or previous screenload of representations of record occurrences to be displayed; First or Last causes the first or last screenload to be displayed. If a previous screenload is to be displayed, the record occurrences are found using the keys stored in Seen-List 176; otherwise record occurrences must be retrieved using the QUERY data structure 162. These operations result in scrolling the displayed list of record occurrences.

It will be evident that the user can select unlimited successive operations of scrolling or transition between LIST and DISPLAY screen formats without causing data processing system 10 to return from WZDISP module 124. The PF key Return causes a return to the previously displayed screen format, if any (as indicated by qry.pxiscr#), or else a return to the calling program.

WZSCRLOD 116. Operating according to WZSCRLOD($qid, @scr) module 116, data processing system 10 accesses the appropriate POP table 156 and PSMP 154 for the particular screen format 166 pointed to by @scr. and fills out the right hand portion of the For-Display-List. Referring now to FIG. 14, the left hand portion of the For-Display-List is provided by data structure 155 within Screen-File 151; for each view field to be displayed on the screen, the location (row and column on screen), the length, and other appropriate information is provided. The right hand portion is provided by data structure 174; for each view field, the memory location, length, type, and other appropriate information about the record occurrence is provided. Portion 174 thus provides the addresses of record occurrences to be displayed; for a LIST screen format, these addresses are to the qry.List-Buffer, while for a DISPLAY screen format the addresses are to System Buffer 168. Display of representations of attribute names as headers 303, view name as view title 310, the appropriate PF keys 204 for the operations selectable during display of the particular screen format 166, and other information is provided for by screen format 166.

WZRETRIEVE 118. Operating according to WZRETRIEVE(qry.source) module 118, data processing system 10, taking into account the signals in qry.source, calls access method 102 of operating system 100. Access method 102 is responsive to signals provided by data processing system 10 operating according to WZRETRIEVE module 118 to cause data processing system 10 to retrieve from the target within the named database 150 one record occurrence specified by the cursor and to store signals representing the retrieved record occurrence in System Buffer 168.

For the LIST screen (which displays a plurality of record occurrences), since System Buffer 168 holds only one record occurrence, signals representing the retrieved occurrences are copied to qry.List-Buffer by data processing system 10 operating according to WZDISP module 124. WZRETRIEVE is repeatedly executed until there are no more record occurrences defined by the cursor, or until enough record occurrences have been retrieved to fill the screen, as defined by the screen limit indicator in PSMP 154.

WZSCRIO. Operating according to WZSCRIO(@qry=$qid, @scr) module 120, data processing system 10 calls WZFORMS(@for-display-list) module 122 to merge the record occurrences pointed to by the For-Display-List (FIG. 14) with the screen format pointed to be @scr, for display to the user. The operation of data processing system 10 according to WZFORMS will be described below; when such operation is complete, signals have been placed in for.fpf-key, and the stored screen image may have been modified corresponding to user input signals. Upon return from WZFORMS, operating further according to WZSCRIO, data processing system 10 uses the signals stored in for.fpf-key (as will be described) as an index to the signals within the POP table data structure 156 for the screen that has been displayed, and copies therefrom signals representing the element "oper", containing "oper-name" and "action", corresponding to the PFkey number, into the storage element qry.oper within QUERY data structure 162.

The signals stored in qry.oper are output signals of the relational operator means, representative of the operation selected by the user.

Figure 10:
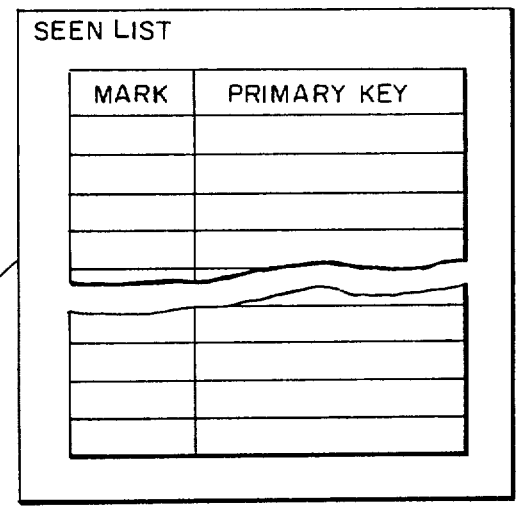

Further operating according to WZSCRIO module 120, data processing system 10 modifies Seen-List 176 by marking records (by setting a flag in the "Mark" column of the list, as seen in FIG. 10) that have been enumerated by the terminal user, as will be described. Processing system 10 returns from WZSCRIO module 120 to WZDISP module 124.

WZFORMS 122. Under control of WZFORMS(@for-display-list, @scr) module 122, data processing system 10 uses the signals representing the addresses in For-Display-List 155/174 to obtain the record occurrence signals from the addressed buffer, and to merge them with the predefined display format signals of Screen-File 151 in order to modify screen format 166 and thereby to define a resultant stored screen image. For the LIST screen, the record occurrence signals are taken from qry.List-Buffer; for the DISPLAY screen a signal record occurrence is taken from System Buffer 168.

Further under control of WZFORMS 122, the data processing system calls Operating System program 100, and operates according to the display control signals therein to control display 18 to display a representation of the resultant screen image stored at 166. Further, during this display, the data processing system enables keyboard 20. The user of the console or terminal may use keyboard 20 to provide input signals.

If on the LIST screen the screen-position-marker is positioned by the user next to the representation of a particular record occurrence, and a PF key 204 is actuated, by default that record occurrence is taken to be enumerated. Alternatively, the user may enter an "X"

or other character next to one or more record occurrences to enumerate them.

The keyboard signals provided by the user are interpreted by the data processing system, operating according to operating system 100, to modify the stored screen image. A signal corresponding to the actuated PF key is also stored. After return from WZFORMS, data processing system 10, under the control of WZSCRIO and WZDISP, interprets the user's input keyboard signals as enumerating signals, effecting enumeration of certain of the retrieved record occurrences whose representations are displayed, and operation selection signals, effecting selection of one of the plurality of selectable operations. Selectable operations are defined for each screen format, but always include Return.

Further operating according to WZFORMS module 122, the data processing system copies the stored signals representing the PF key number to the data storage element for.fpf-key within FOR data structure 164.

When the PF key signals have been copied to for.fpf-key, the data processing system returns from the module WZFORMS 122 to the module WZSCRIO 120.

Operation

In operation according to the signals representing the modules and data structures that have been described, the user of the data processing system terminal selects a database to be accessed and a screen file to be used for the purpose (defined for a particular base table or view). This may be done interactively through the keyboard, or by a calling program. the database 150 and screen file 151 are opened by data processing system 10, which allocates storage space for the DBUSER data structure 173 and TCOM data structure 160. The user formulates a query to the database, represented by a cursor. Data processing system 10 opens the cursor and allocates storage for QUERY data structure 162, determines the strategy for obtaining record occurrences from database 150, and defines qid.

Operating according to WZPXI with a LIST screen format indexed by screen#, data processing system 10 calls WZDISP(qid) module 124. Operating according to WZDISP, data processing system 10 calls WZRETRIEVE(qry.source) which then calls access method 102 within operating system 100, to retrieve from the target signals representing a record occurrence defined by the cursor, and to store them in System Buffer 168. For a LIST screen, multiple record occurrences are retrieved and their signals are stored in qry.List-Buffer.

Upon return from WZRETRIEVE, data processing system 10 calls WZSCRLOD module 116 to complete For-Display-List 155/174, and then calls WZSCRIO module 120; operating according to this module data processing system 10 calls WZFORMS module 122. Operating according to WZFORMS, data processing system 10 uses the address signals in For-Display-List 155/174 to merge the predefined display format signals from LIST screen format 400 stored at 166 within screen-file 151 with the retrieved record occurrence signals stored in qry.List-Buffer, in order to modify the LIST screen format and thereby to define a resultant stored screen image.

Operating according to operating system 100, data processing system 10 then controls display 18 to display a representation of the defined resultant screen image. During this display, system 10 enables keyboard 20. The user may use keyboard 20 to provide enumerating signals, effecting enumeration of certain of the retrieved record occurrences whose representations are displayed; further, by actuating a PF key, the user provides operation selection signals, effecting selection of one of the plurality of selectable operations displayed on the LIST screen.

When a PF key has been actuated, assuming that some records have been enumerated, the data processing system 10 operates according to operating system 100 to modify the defined screen image to correspond with the user's input signals. Further, data processing system 10 causes signals representing the number of the actuated PF key to be stored.

Further operating according to WZFORMS module 122, data processing system 10 copies the PF key signals to the data storage element for.fpf-key within FOR data structure 164. Upon return from WZFORMS, operating further according to WZSCRIO module 120, data processing system 10 uses the signals stored in for.fpf-key as an index to the POP table data structure 156 corresponding to the LIST screen, and copies therefrom the signals of the "oper" corresponding to the actuated PF key into the storage element qry.oper within QUERY data structure 162. The signals in qry.oper-action are output signals of the relational operator means, representative of the operation selected by the user. Further operating according to WZSCRIO module 120, data processing system 10 sets mark flags within Seen-list 176 to mark enumerated records as indicated in the modified screen image.

Upon return from WZSCRIO, further operating according to WZDISP module 124, data processing system 10 tests the signals stored within qry.oper-action. If the action is Next, Prev, First, Last, Return (from Display to List) or Display, system 10 can execute the selected operation while operating according to WZDISP module 124. These actions can be selected as frequently as the user desires, and in any sequence, in order to allow the user to obtain a display of desired record occurrences before enumerating a set and performing operations such as Modify and Delete on the selected occurrences.

If the action is not one of Next, Previous, First, Last, Return to LIST from DISPLAY, or DISPLAY from LIST, data processing system 10 returns to WZPXI module 114. If the action is Modify, Delete or Add, (or other action defined in the POP table but not described herein), WZPXI module 114 returns to the calling program to interpret the action. The specific calling program shown in the present embodiment calls modules 126 and 115 in order to execute the Modify, Delete and Add operations, with the appropriate screen formats from screen-file 151.

If the user enumerates more than one record occurrence on a LIST screen, and then actuates a PF key selecting Delete or Modify, a representation of each enumerated record in turn will be displayed on the indicated screen until all have been displayed.

As a result of the operation that has been described, there is provided an enumerated relation, derived interactively from the initial cursor provided by the calling program in accordance with the user's enumerating signals input through keyboard 20. The enumerated relation (of one member) can be defined by the user through the LIST screen, as has been described, by positioning the screen-position-marker next to the representation of a record occurrence and actuating a PF key; alternatively, the enumerated relation (of one or more members) can be defined by entering a character next to one or more record occurrence representation and actuating a PF key. Finally, the actuation of a PF key by the user while the DISPLAY screen is displayed results in defining an enumerated relation comprising the single record occurrence that is displayed. Further, there is provided an output signal representative of an operaton selected by the user from the dispalyed selectable operations. In all these cases, the enumerated relation is specified by signals representing a "modified cursor" comprising the enumerating marks in the Seen-List. Further operation according to the calling program, which receives signals representing the "modified cursor" and the selected operaton, is thus independent of the manner in which the enumeration was accomplished.

SELECT screen

In addition to the means for defining an enumerated result relation, there is provided means for interactively defining a characteristically defined result relation, that is, a relation, membership in which is defined in terms of record occurrence attributes that are explicitly defined and present in the database target. This is accomplished by means of SELECT screen format 404 and WZSELECT module 128, together with elements already described.

Referring now again to FIG. 16, signals representing a further program module, WZSELECT 128, are provided in the program portion of storage 17 within data processing system 10. When data processing system 10 operates according to WZPXI module 114, as has been described, it tests the signals representing the screen-type (mode indicator) of the screen indexed by screen# within Screen-File 151 (indicated by qry.@pxiscr). If the screen is a SELECT screen, WZPXI calls WZSELECT module 128. Qry.@pxiscr is set to indicate a SELECT screen during operation according to WZDISP module 124, if the user actuates PF key 204-7 while the LIST screen is displayed. WZPXI uses the value of qry.pxiscr# to keep track of transitions between the SELECT screen and the LIST/DISPLAY screens.

Data processing system 10 operates according to WZSELECT module 128 with respect to the signals representing input parameters @qry and @cursor, and calls WZSCRIO module 120 to display SELECT screen format 404 (FIG. 12). The format includes the names of the target relation and view-fields for the target relation.

Operating according to WZSCRIO module 120, data processing system 10 calls WZFORMS module 122, and operates in accordance therewith in the manner that has been described, to display a representation of the SELECT screen format 404, including the target view name at 310 and the view-field names in portion 306. The view name and view-field names are generic elements. Any value of an attribute (field) that was previously made part of the cursor, as a search criterion, is represented on the SELECT screen next to the field name; the remaining fields are shown blank.

The fields, whether blank or displaying previously entered search criteria, are open elements, that is, the user can enter characterizing elements into the open elements. The user can position the screen-position-marker to a desired field, and can enter a value into that field using the typewriter keys 200 of keyboard 20 (FIG. 5) to provide characterizing signals. The display will be altered accordingly. This can be done to more than one of the displayed fields, if desired. The characterizing values entered by the user into the open elements provide new search criteria, further refining or characterizing the cursor with respect to the attributes of the record occurrences in the target relation of the named database.

Finally the user actuates one of the PF keys corresponding to the displayed selectable operations. Selectable operations on the SELECT screen include List, Delete and Modify. Signals representing the actuated PF key are stored in for.fpf-key in the manner previously described, and data processing system 10, operating according to WZSCRIO module 120 in the manner previously described, copies the POP.oper signals for the actuated key to qry. oper.

However, operating further according to WZSELECT module 128, data processing system 10 derives a new cursor by modifying the signals of the CURSOR data structure 158 to reflect the characterizing values entered by the user into the displayed view fields. Data processing system 10 then closes the original cursor (by calling and operating according to an appropriate module, not shown, but conventional in design) and then calls WZOPEN CURSOR module 110. Operating according to the signals of module 110, data processing system 10 allocates storage for a new QUERY data structure 162, corresponding to the new (modified old) cursor. Data processing system 10 then returns from WZSELECT module 128 to WZPXI module 114. Data processing system 10 sets qry.source to reflect the screen type pointed to by qry.@pxiscr.

The result of the operation according to the WZSELECT module is that there is interactively provided a result relation, defined characteristically, that is, in terms of attributes represented explicitly in the record occurrences within the target relation of the database. Further, there are provided output signals representative of an operation selected by the user from the displayed selectable operations, including operations performable by data processing system 10 on the result relation.

If the actuated PF key selected the LIST operation, WZPXI, responsive to the screen-type of the LIST screen, will call WZDISP module 124 in the manner previously described, for the display on the LIST screen of the record occurrences defined by the redefined cursor. The user can now enumeratively define a relation, derived from the redefined cursor. If the actuated PF key selected either Delete or Modify, representations of the record occurrences, specified by the redefined cursor will be displayed sequentially on the appropriate screen, permitting such action to be taken by the user with respect to each record occurrence in the database.

In preferred embodiments, the relational operator means comprises means for providing an output signal representative of an operation selected from a plurality of selectable operations displayed to the user, together both with means for providing a result relation, membership in which is defined enumeratively and interactively through the keyboard, and with means for providing a result relation, membership in which is defined characteristically and interactively through the keyboard. However, either means for providing a result relation may be provided without the other, and considerable advantages in the interactive maintenance of relational databases may be realized thereby.

If means to define both enumeratively and characteristically defined result relations are to be provided, then the WZPXI module 114 must provide signals representing instructions of the following general form (the terminology is not that of any standard programming language):

```
set pxi-handled-action=yes
loop while pxi-handled-action=yes:
    test screen type of screen pointed to by qry.@px-
        iscr
    if type is SELECT, call WZSELECT (that will set
        qry.action)
    if type is DISPLAY or LIST, call WZDISP (that
        will set qry.action)
    test qry.action
    if action is Select, List or Display,
        get the appropriate screen (and loop)
    else if action is other,
        set pxi-handled-action=no, (exit loop)
return to DOQUERY.
```

Operating according to the calling program which has called the modules described herein for the operation of my relational operator means, data processing system 10 can obtain signals representing the selected PF key operation from $oper-name. Such signals are also provided in ATAB data structure 172. (The signals are provided in two forms for reasons not pertinent to the present description.) Data processing system 10 can then proceed with further operation as controlled by the calling program.

The relational operator means has provided a result relation, derived interactively from the initial cursor provided by the calling program in accordance with the user's signals input through keyboard 20. The result relation may be either an enumeratively defined relation, specified by a "modified cursor" comprising the enumerating signals (represented as the marks in Seen-List 176, FIG. 10) or a characteristically defined relation, defined by the modified cursor signals in CURSOR data structure 158.

In either case, the interactively defined result relation has the characteristics of a relation as defined in the context of relational databases, that is, further operations, designed and built for use on relations, can be carried out on the result relation. In particular, the records of the result relation can be retrieved under the control of modules designed for the retrieval of records in a relation. Moreover, the result relation can be operated on by the calling program in any desired manner without regard to the specific way in which it was defined, making the calling program independent of the physical structure that was used (keyboard, touch screen, or the like), as well as independent of whether the result relation was enumeratively or characteristically defined. This provides great flexibility in the use of such result relations.

Figure 8:
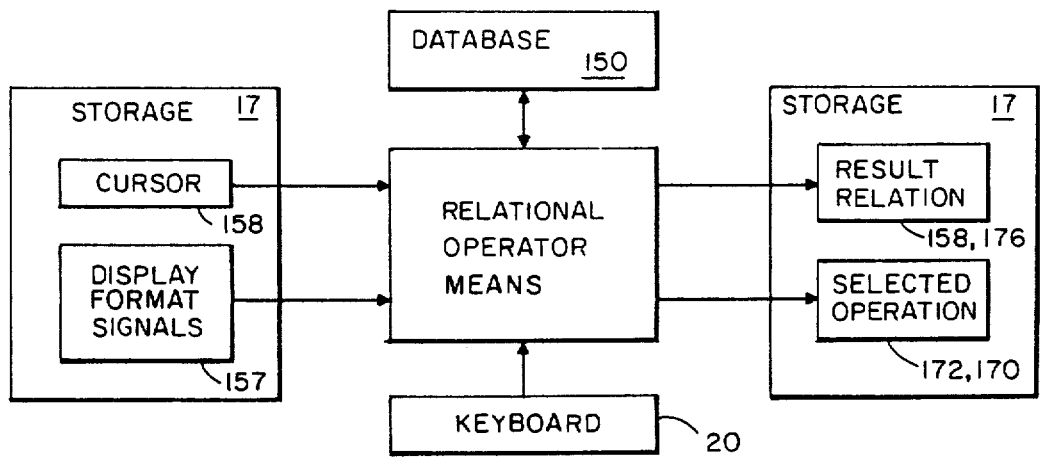
FIG. 8 is a conceptual (black box) showing of the relational operator means of my invention.

Referring now to FIG. 8, my relational operator means is shown conceptually as a "black box". The inputs to the black box are the cursor signals, provided, as has been described, by the calling program (or defined by WZSELECT module 128 in the particular case when the initial screen is a SELECT screen, as has been described), and display format signals, which have been predefined and stored in Screen-File 151. The signals from keyboard 20 are further input to the black box, which produces output signals representing a result relation, together with a selected operation (selected from among those presented to the user for selection by PF key actuation). The signals representing the result relation are stored in CURSOR data structure 158, and also in Seen-List 176 (for the enumeratively defined result relation); the signals representing the selected operation are stored in data structures ATAB 172 and $oper-name 170.

Since the described relational operator means in effect operates to transform an input relation (defined by the cursor) into a result relation, this operator means is closely analogous to the well known relational operators, defined for operation on the tables of relational databases, namely PROJECT, SELECT and JOIN. (Other relational operators have also been defined by various writers.) A necessary characteristic of a relational operator is that it operate on a relation to produce another relation, which can itself be operated on by a relational operator. This characteristic is otherwise expressed (in mathematical terms) as the statement that the set of possible relations is closed under the operation of a relational operator. Note that the result relation need not be a physical or base table within the database, but it must conform with the definition of a relation.

The described operator means complies with this requirement, and thus can be regarded as a relational operator. This feature of the operator means makes it possible to employ this means as part of a sequence of relational operators. Further, it makes it possible to fetch from the database the records of the result relation, using the same operation that is used to fetch records of any relation defined in the usual way by a cursor. This provides economy of programming and simplicity of operation.

However, each standard operator, when applied to a relation, implicitly defines a result or product relation, membership in which is determined by the value of one of the attributes of the records within the initial relation defined by the cursor. That is, membership in the result relation is defined "characteristically", by means of a characteristic or attribute of the records that is explicitly present in the database. For example, it is possible to SELECT from a table of customers those customers having green hair, only if hair color has been defined as an attribute for that relation.

In contrast, my relational operator means provides for the definition of a result relation, membership in which is defined "enumeratively", that is, by means of enumeration by the user through the keyboard, and such membership may therefore be independent of the record occurrence attributes explicitly defined and present in the stored database, but may depend on some aspect of the entity underlying the record, perhaps known only to the user.

Therefore, my novel operator means makes it possible to construct interactively an arbitrary set, enumerated by the user, and thereafter to treat the set as a member of the class of relations, with all the advantages of data manipulation which result from this. In prior art data management systems, a table of enumerated members could be built, but only by explicit programming (in the applications program) designed for such purpose, and the constructed table could not then be treated as a member of the set of relations. Consequently, for example, the records could not be fetched using the same operation that is used to fetch records in the relations; rather, an additional program module had to be provided for this purpose.

My operator means further provides for the interactive definition of a result relation, membership in which is defined characteristically in terms of a record occurrence attribute explicitly defined and present in the database; such interactive definition is thereby made much simpler than has been possible using prior art means.

A particular embodiment of the present invention comprises particular data structure definitions and program modules, running on a Wang VS-100 (virtual storage) computer. Source code for the particular data structure declarations and program modules is provided in the accompanying microfiche appendix.

The relational operator means described above is employed sequentially with respect to more than one screen-file and more than one database, to effect the interactive construction and execution of a database maintenance application program.

Reference is made to FIG. 17. In this conceptual showing are represented the operations of data processing system 10, with respect to the working storage and database storage portions of storage 17, under the successive control of certain program modules. It will be understood that during such operation, the signals representing each program module are copied from program storage and are used to control the physical state of various hardware elements of system 10 in order to effect the desired physical operations. In this figure, for simplicity, the data processing system is not itself explicitly represented. However, the lines labeled "accesses" represent operation by processor 12 to read (obtain signals from) the represented storage structures in storage 17; the lines labeled "constructs" represent operation by processor 12 to allocate storage for and write (place signals into) the represented storage structures in storage 17. The indicated inputs from keyboard 20 are understood t be input signals from keyboard 20 to processor 12. The parameters $screen-file and $database are understood to be signals representing appropriate values of these parameters, input to processor 12 in any appropriate manner.

Outline. The signals representing the DD Screen-file 502, the meta-meta-database 504, the AB Screen-file 510, and the @Default screen-set 511 are provided in storage 17 before operation begins. Referring to FIG. 17, data processing system 10 first operates under the control of a first program module (DD Definition) 500 with respect to a first screen-file (DD screen-file) 502 and a first database 504, both to be described below. The data processing system advantageously employs the relational operator means described above and receives input signals from keyboard 20, which are interpreted by data processing system 10 operating according to module 500 in order to derive and store in the database storage, signals representing a second database 506, which will be described below.

Next, data processing system 10 operates under the control of a second program module (Application Builder) 508 with respect to a second scree-file (AB screen-file) 510 and a screen-set 511 called "@DEFAULT", both to be described, and with respect to database 506 constructed during the previous step. Data processing system 10 advantageously employs the relational operator means described above and receives input signals from keyboard 20, which are interpreted by data processing system 10 operating according to module 508 in order to derive and store in working storage signals representing a third screen-file 512, to be described below.

Finally, data processing system 10 operates according to an interpretor program, such as the PACE RUN module 514, with respect to the constructed screen-file 512 and the third database 516, employing the relational operator means described above, in order to permit interactive maintenance and use of database 516 from the system terminal. The constructed screen-file 512 thus functions as an application program for the interactive use of database 516, as will be described.

The first database 504 is a meta-meta-database, that is, it comprises a generic description of any database definition (meta-database). It contains relations whose record occurrences are generic definitions of the elements of a database: files, views, records, and relationships. During operation of data processing system 10 according to module 500, the user provides names of relations, column or domain names, attribute definitions, field lengths and types, and all the necessary information about the particular database 516 whose record occurrences will ultimately be manipulated by the user, using the application program. The definition of the particular database 516 thus provided by the user, and forming database 506, may be called a "meta-database", that is, a description of a particular database. The meta-database 506 is itself a relational database.

By employing the described relational operator means, the data definition process may advantageously be accomplished interactively and nonprocedurally. The user need not learn a data definition language, or memorize names of data items or operations. Thus, nonprogrammers are enabled to perform data definition.

Further, the definition of built screen-file 512 may also be advantageously accomplished interactively and nonprocedurally by the employment of my relational operator means, and thus may be carried out by nonprogrammers. In effect, a nonprogrammer is thus enabled to create an application program.

Further, when the constructed application program is run (that is, when constructed screen-file 512 is employed to permit interactive maintenance of database 516), the plurality of operations, shown on the display and selectable by means of a PF key 204, in addition to the operations described above, includes a further type of operation generically referred to as a "descend" operation. This operation enables the user easily to obtain a display of record occurrences related to an initially displayed record occurrence, as will be explained.

Data dictionaries. Data dictionaries, or descriptions of databases, are in general well known in the database management art, and may be constructed in a number of ways. A data dictionary consists of descriptors of data attributes, such as names of fields and field lengths. In particular, the base tables, fields, keys, files, and view tables of the database are defined in the data dictionary.

Further, some prior art data dictionaries for a relational database have provided definitions of the relationships between the tables (relations), or in some cases the records, of the database.

Figure 23:
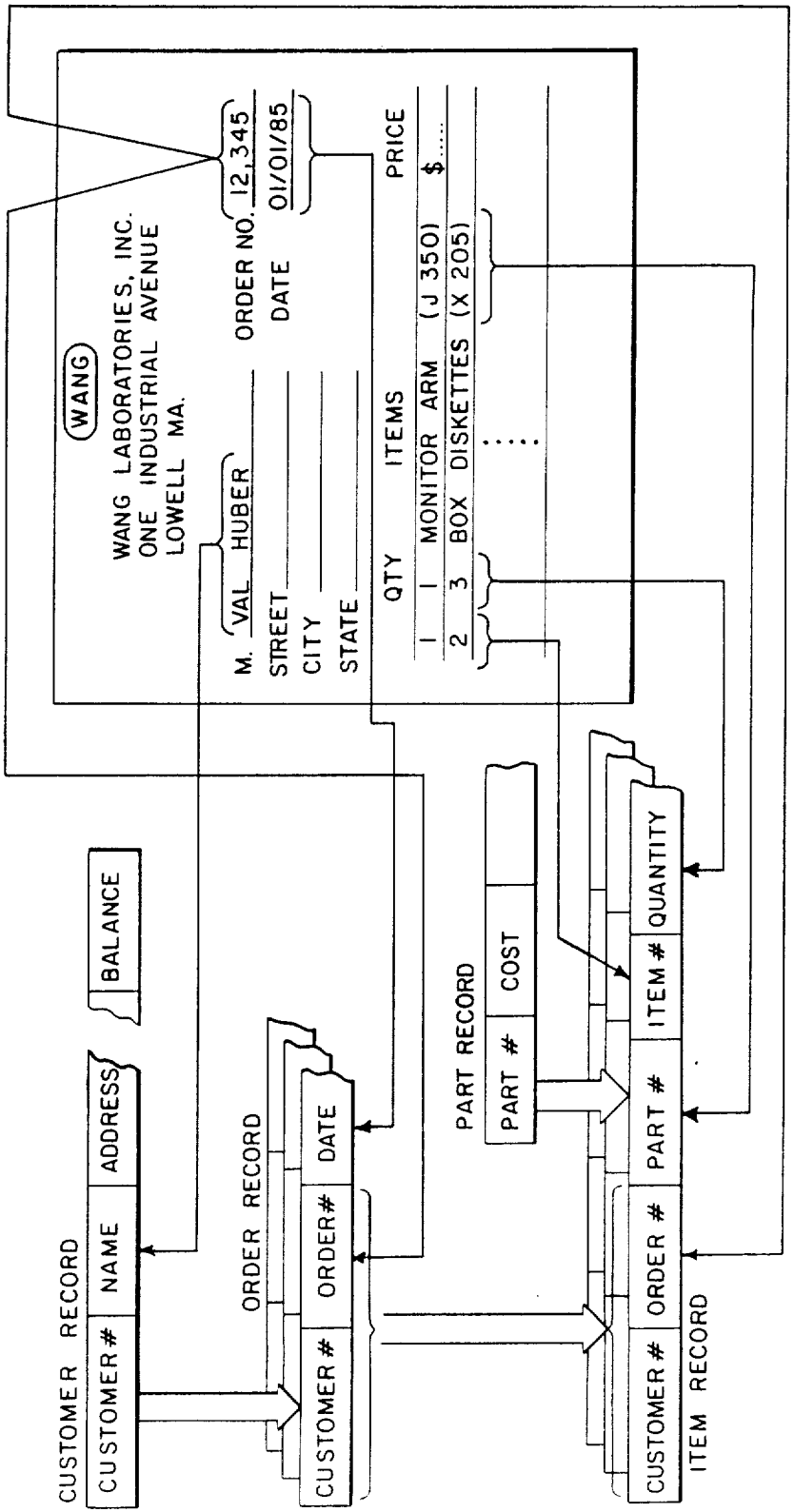
FIG. 23 is a conceptual showing of the relationships among certain exemplary database records.

Relationships. Referring now to FIG. 23, certain records of an imaginary database are shown by way of example. It is assumed that this database provides tables (relations) called Customer, Order, Item, and Part. Other tables may be present.

A record from the Customer table (which comprises many such Customer records) includes the fields named Customer#, Customer Name, Address, and Balance, as well as others not here pertinent. It is assumed that the Customer# is a unique key in the Customer table, that is, its value uniquely identifies a customer. A record from the Order table (which comprises may such Order records) includes the fields Customer#, Order # and Date, with other fields not here pertinent. It will be apparent that if the value of the Customer# of a Customer record is the same as that of the Customer# of an Order record, this fact may be used to relate the Customer record to the Order record, or vice versa. The fact that a Customer# field is present in every Customer record and in every Order record relates the Customer table to the Order table. As there may be many Order record occurrences related to a single Customer record occurrence, the Customer record is defined as the "parent" or "owner" and the Order record is defined as the "child" or "member".

A database manager, having a database which already provides a Customer table, may define an Order table having the fields Order# and Date. In order to provide a relationship between the Order table and the Customer table, it is necessary that the Order record further include the Customer# of the customer to which that Order record is related. If this field is not already defined in the Order table, it must be added to support the relationship.

Further considering FIG. 23, an Item record is related to an Order record by two fields, the Customer# and the Order#. The values of both must coincide if a particular Item record is related to a particular Order record. There may be many Item records related to a single Order record. A Part record may be related to an Item record by the Part#; many Item records may be related to a single Part record.

Relationship attributes. As is known in the prior art, a relationship is defined by the attributes:
  name of parent record, name of child record
  set of parent relationship fields (must be a defined unique key)
  set of child relationship fields
  integrity rules (described below)

The parent relationship fields in the Order record of FIG. 23, for example, are the Customer# and the Order#. These are also the child relationship fields in the Item record.

Therefore, the process of definition of a relationship includes the following steps:
1. Define the parent relation and the parent relationship fields.
2. During the process of defining the fields in the prospective child relation, specify the parent table for the relationship. The parent table must have a defined unique key in each record occurrence.
3. Specify which unique key (if there is more than one) in the record occurrences of the parent table is to be used for the relationship. The field definitions of this key are copied into the definition of the child table.
4. Define integrity rules for the relationship. These may be provided as default rules, or modified by the user.
5. Continue with the definition of child table fields not participating in the relationship.

Integrity rules govern the addition, modification, or deletion of records in related tables. For example, if relationships are defined between customer and order tables in a database, an integrity rule can be defined such that a record occurrence cannot be added to the order table unless there is already present a record occurrence in the customer table to which the added order record can be related.

Two further attributes of a relationship are defined and signals representing them are stored in the Data Dictionary, namely the ascend and descend names of the relationship. The ascend name refers to the relationship when the user is viewing the child records; the descend name is used when the user is viewing the parent records. Thus, when viewing the Order table, the name of the relationship might be "Customer"; when viewing the Customer table, the name of the relationship might be "Orders". (Note that the relationship is one to many, Customer to Orders.)

However, the names of the relationship need not necessarily be the same as the names of the related tables. For example, if an Employee table and a Manager table are related as child and parent, the ascend relationship name might be "reports to" while the descend relationship name might be "supervises".

For convenience herein, the term "descend" is sometimes employed to refer generically to operations performed at run-time with respect to actual record occurrences, involving the relationship viewed from either direction.

Referring to FIG. 17, for each relation (base table or view) in database 516, there is provided a relation descriptor 570, which provides signals representing the name of the relation and other pertinent information, such as names of fields within it, types of fields, lengths of fields, and the like.

When all attributes have been defined, data processing system 10 assigns a relationship ID# to the set of attributes of each defined relationship; signals representing these attributes are stored in Relationship Attribute storage 520 within Data Dictionary 506 in storage 17, and are indexed by the relationship ID#. For each relationship in which the relation participates, the relationship ID# is included in the descriptor 570 for that relation.

Data Definition Module 500. Referring now to FIG. 17, the program storage portion of storage 17 provides a program module 500 called DD definition.

The DD definition module can be constructed as a calling program to the modules (other than PACE RUN) shown in FIG. 17. That is, data processing system 10, during operation under the control of module 500, can operate according to the modules described above, which permit interactive definition of enumeratively defined result relations, with the selection of one of the selectable operations.

Specifically, when called by DD Definition module 500, the described relational operator means operates with respect to screen-file 502 in data storage 17, which provides a set of screen formats suitable for eliciting from the terminal user a definition of database 516, and with respect to the meta-dictionary 504. Screen-file 502 includes LIST, DISPLAY, and MODIFY type screen formats 503, with associated control signals 505 (POP tables, Screen Maps, and the like) all as described. (A LIST screen displays a list of record occurrences, while a DISPLAY screen displays more complete information (more fields) for a single record occurrence.)

FIG. 18 shows a LIST screen format from screen-file 502, used to display a list of all existing tables (named Customer, Item, Order and Part) in an exemplary database, together with the first thirty characters of each table's comment field. Actuation of PF key 204-10 on keyboard 20 when this screen is displayed results in a transition to the display of the complete comment field for a particular table (enumerated in the manner described above) using a DISPLAY format; the means for accomplishing such transitions have been described. Actuation of PF key 204-6 results in a transition to the display of an ADD screen format from screen-file 502, as shown in FIG. 19, also by means described.

Actuation of PF key 204-1 (Advanced Functions) when the LIST screen of FIG. 18 is displayed results in a transition to display of the Advanced LIST screen, with representations of PF keys 204 associated with another plurality of selectable operations (FIG. 20). (This transition, although not explicitly described, is accomplished by WZPXI module 114 in a manner similar to that described for similar transitions.) Among this plurality of selectable operations are several operations relating to the defining of relationships in which the listed tables participate. In particular, a selectable operation is provided for "Create Relationship".

Actuation of PF key 204-6 for Create Relationship during display of the Advanced LIST Tables screen results in a transition to display according to a screen format (not shown), which permits the user to define the attributes of the relationship. (In alternative embodiments this function might be accessed from a LIST Fields screen.) Signals representing such attributes are stored by data processing system 10 in Data Dictionary 506, within the data structure 520, "relationship attributes", indexed by the relationship ID#.

Operating according to naming module 526 of DD Definition module 500, data processing system 10 accesses within Data Dictionary 506 the definitions of the two related tables, retrieves the names of the tables, and assigns the names of the tables as the default ascend and descend names of the relationship.

Figure 21:
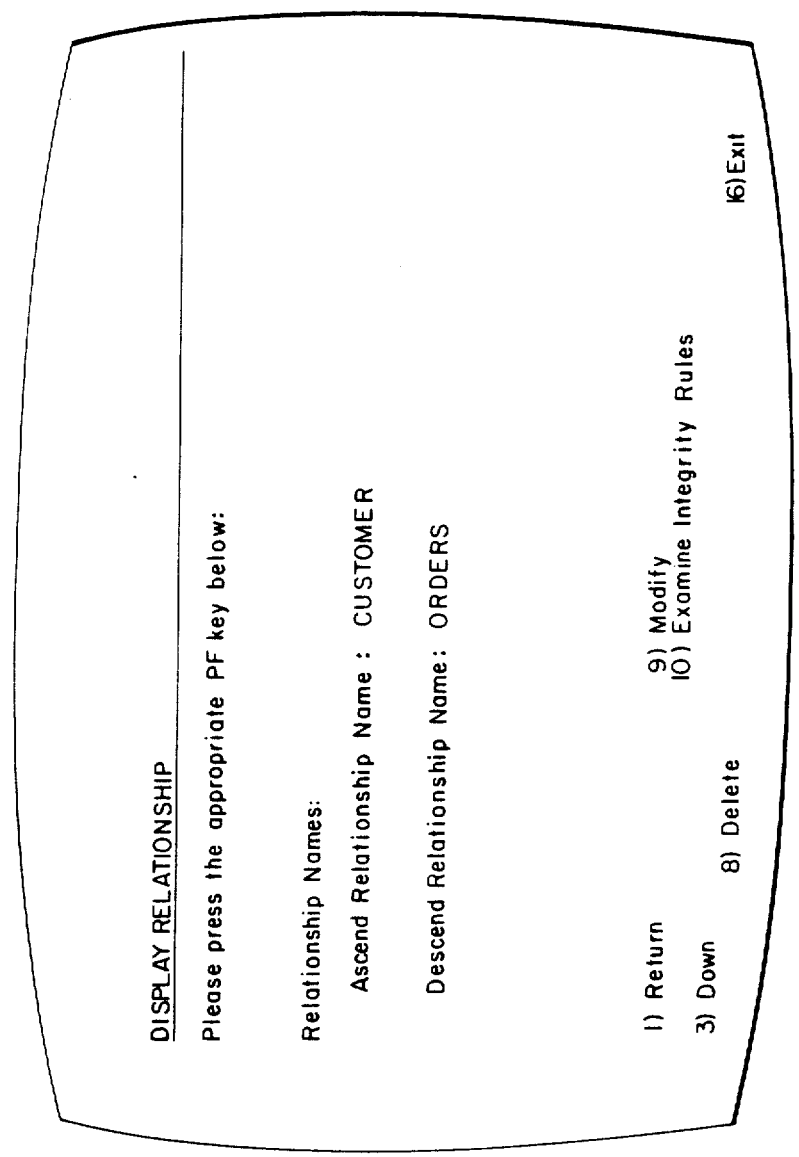

Actuation of PF key 204-9 during display of the Advanced LIST screen results in a transition to the DISPLAY RELATIONSHIP screen (FIG. 21). This screen provides a display of representations of the characters of the assigned ascend and descend names of the relationship. Actuation of PF key 204-9 (Modify) during display of this screen causes a transition to a MODIFY screen format (by means described above); in this format, representations of the characters of the ascend and descend names are displayed in open areas, that is, areas modifiable by the user through keyboard 20. The user can then use typewriter keys 200 of keyboard 20 to provide input signals representing modified relationship names. Signals representing the characters of the assigned (default) names or the modified names, if any, are stored in data element 524 of data structure Relationship Attributes 520, indexed by relationship ID#, within Data Dictionary 506 for database 516. The names of the relations which are related by attributes 520 are stored at 527.

When the construction of Data Dictionary 506 is complete, operation according to the next module 508 can begin.

Application Builder module 508. An Application Builder module 508 is provided in the program storage portion of storage 17. Operating according to this module, data processing system 10 may also advantageously employ the relational operator described above, which operates with respect to the meta-database 506 and AB screen-file 510 (FIG. 17). However, the operations performed by data processing system 10 to accomplish the functions described belos may also be carried out by other suitable means. In outline, operating according to the Application Builder module, DP system 10 constructs within storage 17 a particular screen-file 512 tailored for the maintenance of one or more particular target relations within database 516. This operation will now be considered in greater detail.

Operation according to module 508 begins after the terminal user has selected a database. The database must have been defined; that is, its meta-database or Data Dictionary 506 must have been defined and signals representing it stored in storage 17 in the manner described above, and in particular, the ascend and descend names of all defined relationships must have been defined and representations of the characters of the names stored at 524.

Data processing system 10 under the control of Application Builder module 508 operates with respect to the input parameters $database and $screen-file. The particular value of $database designates the database 516 to be managed by the application program; the Data Dictionary 506 for that database is accessed. The particular value of $screen-file designates the AB screen-file 510.

The @Default screen-set 511 is also accessed. Screen-set 511 provides archetype (default) screen formats 521 for each screen-type (LIST, DISPLAY, SELECT, ADD, MODIFY, DELETE) and an archetype POP table 509 associated with each screen format. The archetype screen formats are similar to those shown in FIGS. 20 and 25 but lack specific representations of the target relation name and the column or domain names, and other information regarding the PF keys. Such representations are replaced by open elements. The POP table 509 specifies which PF keys 204 can be represented on a particular format, and includes for each PF key signals necessary for carrying out the operation selected by that key. The POP table is not complete, in that PF keys for descend operations may be added at a later stage, as will be described.

Since screen-set 511 is provided separately from AB Screen-file 510, the formats 523 can be edited globally by the user; for example, the language of the fixed text can be changed. A particular @Default screen-set 511 is associated with a particular Data Dictionary 506.

Screen-file 510, with respect to which data processing system 10 operates according to the modules of FIG. 16 when called from Application Builder module 508, provides AB screen formats 523, used for the display of record occurrences retrieved from Data Dictionary 506, with associated control signals 525 comprising POP tables, Screen Maps, For-Display-Lists, and other data structures as described in more detail above.

Figure 24:
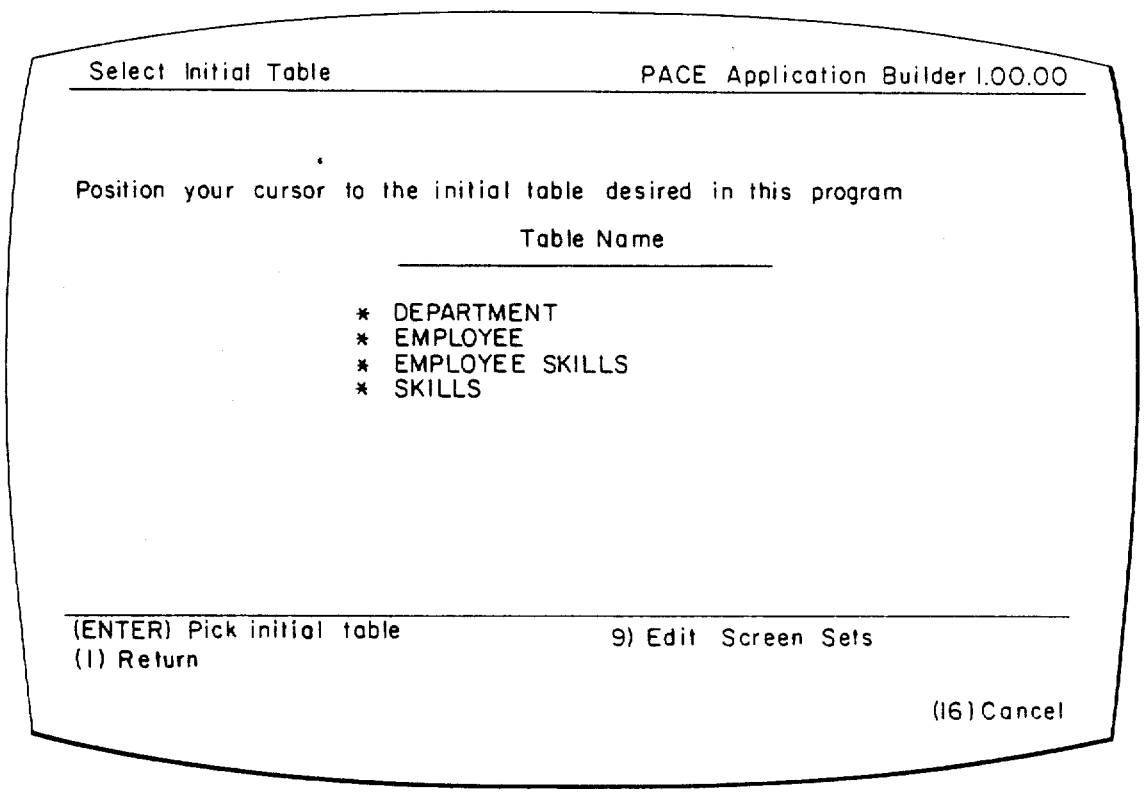
FIGS. 24 and 25 show in detail certain further screen formats employed in the system described.

Operating first according to the Display module 550 of Application Builder module 508, and using the input parameter $database, designating the database 516, data processing system 10 (advantageously employing the relational operator means described above) retrieves from Data Dictionary 506 signals representing a list of names of relations (base tables or views) in database 516. Representations of the names are displayed in a first screen format from AB formats 523, as seen in FIG. 24. By positioning the screen-position-marker and actuating the ENTER key 206 (FIG. 5), the user can select an initial table.

Operating further according to module 550 of module 508, data processing system 10 uses the name of the selected initial table to obtain from the descriptor 570 for that table, a list of relationship ID#s for relationships in which that table participates. The relationship ID#s are used to index data structure 520 in Data Dictionary 506, and to retrieve signals representing the names of the related tables from 527. Representations of the names are displayed in a second screen format from AB formats 523, as seen in FIG. 25.

By actuating ENTER key 206 and positioning the screen-position-marker by means of keys 208 (FIG. 5), the user can select one or more related tablets (relations) for inclusion in the application program. In the present description, the table which is initially displayed (or whose name is initially displayed) is referred to as a "starting" relation, while a selected related table which is subsequently displayed (or whose name is subsequently displayed) is referred to as a "destination" relation.

Figure 25:
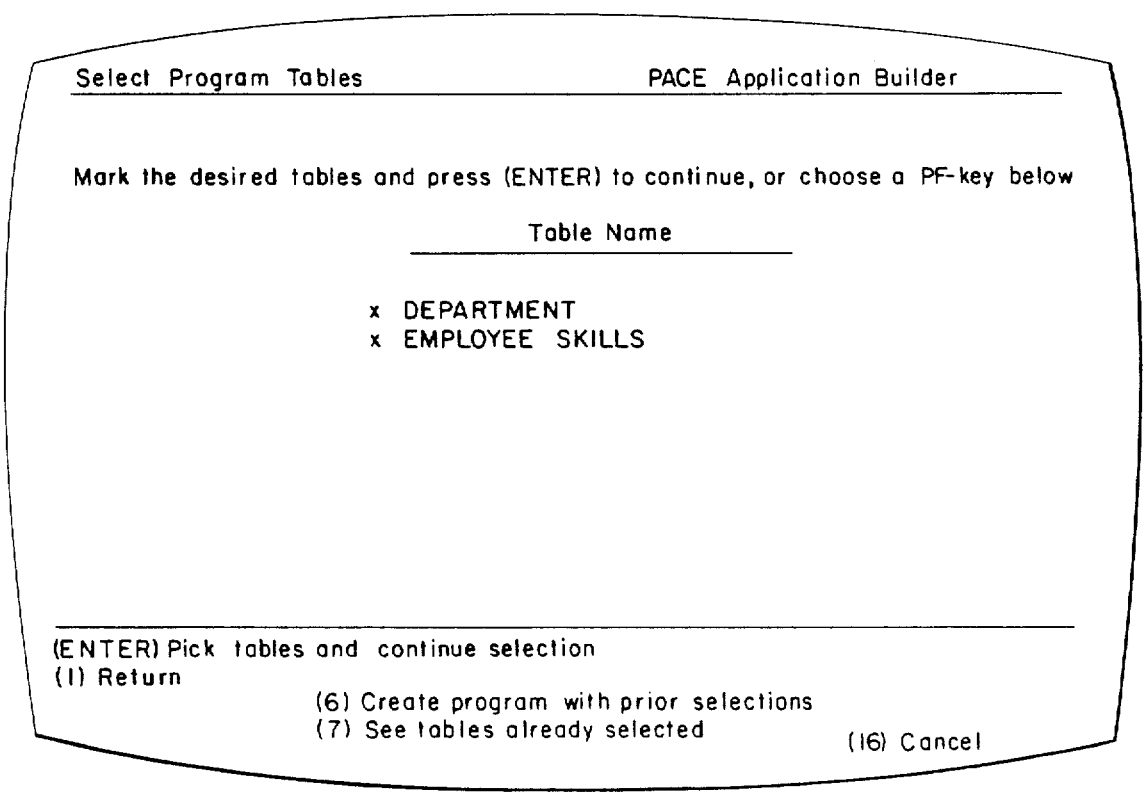

This process is repeated until either there are no related tables unselected, or the user actuates PF key 204-6 (Create Program) during display of the screen format of FIG. 25.

The archetype screen formats 521 in screen-set 511 are next copied for modification. Signals representing the selections made by the user during previously described displays are then used by data processing system 10, operating according to Create Sceen-file module 552, to modify the copied archetype screen formats 521 to define screen-sets for all selected tables. A screen-set 522 is provided for the "starting" relation, and a screen-set 532 is created for each "destination" relation. The signals stored in Data Dictionary 506 are retrieved and used at this time to provide for the representation of screen fields, column headers, prompts, and other fixed text. The modified screen formats of 522 and 532 are stored as part of constructed screen-file 512.

In addition, Create Screen-file module 552 provides means for constructing, by referring to the archetype POPs 509 and the Data Dictionary 506, within screen-file 512 the associated control signals at 530 and 534 comprising POP (Procedure Operation) tables, PSMPS (Procedure Screen Maps), and other elements, associated with the defined screen sets and required for the proper use of such screen sets. For example, such Data Dictionary stored signals as those defining the type and length of the fields are retrieved and used to construct an appropriate Screen Map.

In this process, the relationship attributes of 520 are used in three ways. First, the screen formats 522 in the screen set for the starting relation are modified to provide for the display of the representation of a PF key 204 in association with the name of the relationship (from 524) to the destination relation. Since the name of the starting relation is known, the appropriate ascend-/descend name can be selected for the direction of the relationship. Further, the POP table within control signals 530 for each screen format 522 is modified to include signals representing an oper defined for that PF key. The oper.action is "descend# via screen#"; the oper.name is the name of the relationship, copied from data storage element 524. Each descend operation is uniquely identified by "descend#", which indexes a unique PDSC data structure 538 (described below). There may be more than one descend transition defined on a given screen-format; each is identified by a unique descend# in the pop.oper.action.

Second, an additional screen-set 532 is constructed in screen-file 512, by modifying a copy of the archetype screen-set 521 in accordance with the information in Data Dictionary 506 describing the destination relation (screen fields, relation name, column names, and the like) as described above. Appropriate POPs, PSMPs and other control data structures are defined and signals representing them are stored in screen-file 512 at 534.

Third, operating according to Application Builder module 508, data processing system 10 builds (allocates storage and stores signals therein) a PDSC data structure 538 within screen-file 512. A particular PDSC data structure is built for each selected transition from a first or "starting" relation to a second or "destination" relation, and is identified, as stated above, by a unique descend#.

Figure 22:
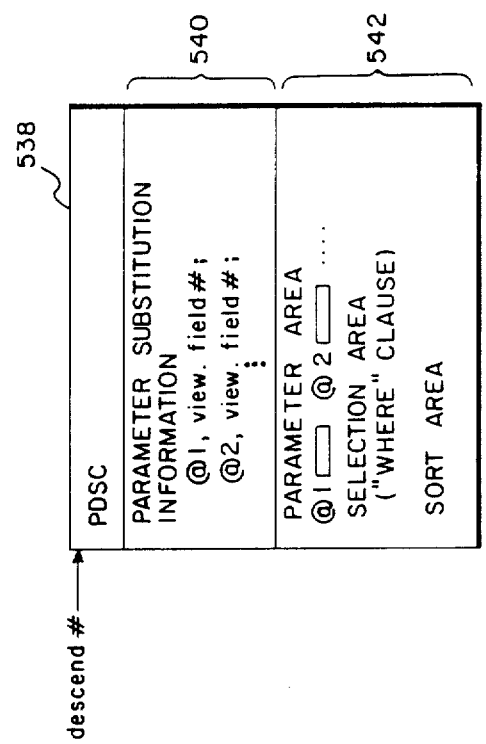
FIG. 22 shows a part of FIG. 15 in more detail.

Referring now to FIG. 22, PDSC data structure 538 comprises two portions 540 and 542. Portion 540 provides signals representing control information; the second portion provides signals representing a cursor defined against the destination relation, but not completely specified. The selection area or "where clause" of this cursor includes one or more locations identified by parameters @1, @2, . . . , while the signals of control portion 540 are employed (at a later time, as will be explained) by data processing system 10 to obtain signals to be placed in the locations, representing values for the parameters. Specifically, the parent relationship fields must be copied into the cursor at the @1, @2 . . . locations in order to retrieve related child record occurrences through this cursor. In constructing PDSC data structure 538, the specification of fields identified by parameters @1, @2 . . . and of the control information signals in portion 540 is derived from the attributes of the relationship stored at 520 in Data Dictionary 506 within storage 17. The function of the parameters @1, @2 . . . will become clear in what follows.

PDSC data structure 538 is stored in built screen-file 512.

By selecting an initial table, from the display of FIG. 24, the user defines a value for "Initial Table" within data structure PDEF 153 in Screen-file 512. A default order of screen-format presentation is defined by data processing system 10 operating according to Create Screen-File module 552.

Advantageously, a further module 554 "Screen Edit" may be provided in Application Builder module 508. Actuation of PF key 204-9 "Edit Screen Sets" during display of the screen format shown in FIG. 24 causes data processing system 10 to operate according to this module, and under its control, representations of the screen formats 522 and 532 are displayed to the user in "prototype" form, that is, with specific headers and relation names taken from Data Dictionary 506, but with X's or other symbols representing the record occurrences. No record occurrences are actually retrieved from database 516 at this time. Appropriate means for editing the appearance of the screen formats is provided; in addition, the order of presentation of the formats may be changed by the user. The presentation of PF keys on each format may also be edited; for instance, to prevent deletion of record occurrences at a later time, the PF key for the Delete operation can be removed from the format.

Interpretation of constructed program. When the built screen-file 512 has been completely defined and signals representing it have been stored in the working storage portion of storage 17, it constitutes in effect an application program for the interactive, nonprocedural maintenance of the database 516 for which it was constructed. When it is desired to use this application program, an interpretor must be employed, and in particular, the PACE RUN module serves as such an interpretor. For the purpose of interpreting the signals representing the "descends", two additional program modules are provided in program storage portion of storage 17: PXIDSC module 600 and WZFETCH(qid) module 602. Additionally, the DO DSC module 107 within the calling program calls to DO QUERY module 108.

WZFETCH module 602 calls WZRETRIEVE module 118 to retrieve a single record occurrence from database 516, without displaying it. The parameter "qid" identifies the query to be used in the retrieval. Other particular features of the FETCH module are not pertinent herein.

When the constructed application program is run, data processing system 10 operating according to the PACE RUN module in the manner described accesses and opens screen-file 512. The signals stored in PDEF 153 are used to access an initial screen format 522 and initial relation (table) from database 516. If the format was so modified during the previous operation of the data processing system according to Application Builder module 508, the initial screen format includes a representation of a PF key 204 for a descend transition to a display of a related relation. Record occurrences defined by cursor 158 are retrieved from the initial target relation and merged with the initial screen format to define a stored screen image.

As described above, the stored screen image is displayed, and signals representing either enumeration or characteristic selection of a result relation are input through keyboard 20 and stored in working storage 17. Input signals representing selection of an operation by actuation of a PF key 204 on keyboard 20 are stored in the data element for.fpf-key within FOR data stucture 164.

When the operation selection signals input by the user through keyboard 20 represent actuation of the PF key 204 corresponding to a specific descend transition, data processing system 10 operating according to WXSCRIO module 120 copies the signals representing the pop.oper for that PF key into QUERY.oper, as has been explained. The oper.action for that PF key is "descend# via screen#", identifying the particular PDSC structure 538 within screen-file 512 that corresponds to that descend transition. Data processing system 10 then returns to DO PXI module 112, with signals representing the action "descend#" stored in data element ATAB 172.

Operating according to DO PXI module 112, data processing system 10 tests the signals in ATAB 172, as described above. In this case, in response to signals representing the action "descend#", data processing system 10 operates further according to the module PXIDSC 600 to call FETCH(qid) module 602, which calls RETRIEVE module 118.

Figure 15:
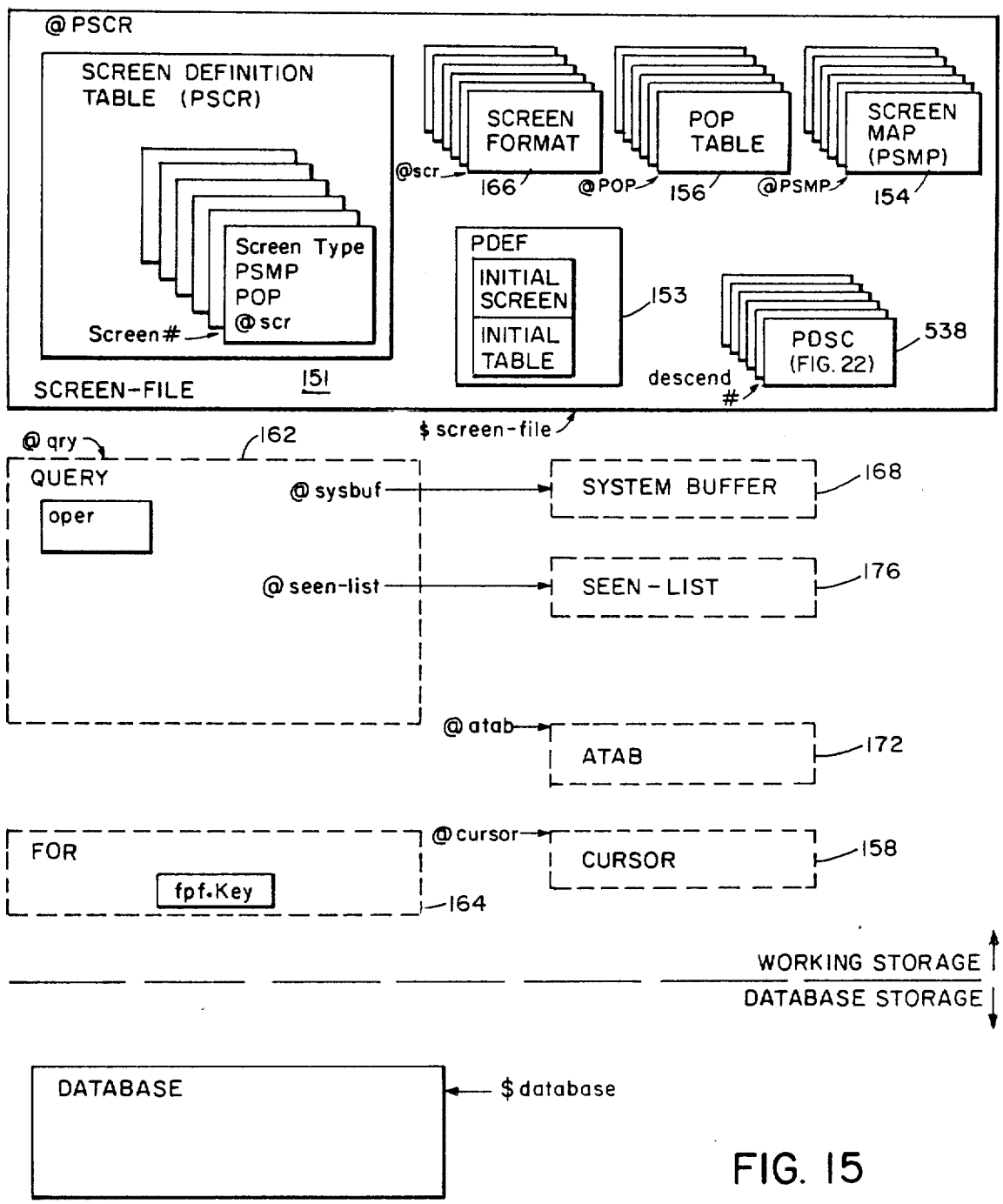
FIG. 15 shows the allocation of part of the data storage portion of the storage of the data processing system of FIG. 1.

Operating according to RETRIEVE module 118 and according to the stored signals defining the result relation (either the marked records in Seen-List 170 or the modified cursor in data structure 158, as described above), data processing system 10 copies from database 516 signals representing the first record occurrence in the result relation. Since the result relation is defined from the "starting" relation, the record occurrence retrieved in response to FETCH is a member of the starting relation, defined by the modified query identified by qid. The retrieved record is not displayed; it is stored in System Buffer 168 (FIG. 15). When the record has been retrieved, PXIDSC 600 calls DO DSC module 107.

Data processing system 10, operating according to DO DSC module 107 and accessing the first portion 540 of PDSC data structure 538, copies from the retrieved record occurrence, signals representing the values of the relationship fields, to the locations indicated by the corresponding parameters @1, @2 . . . within second portion 542 of PDSC 538 as defined by first portion 540. The copied fields are the keys which are present in both the parent records and the related child records, as previously described. Therefore, the values of these fields are effective to define which are the related record occurrences in the destination relation. This operation completes the cursor provided by PDSC 538. The cursor is now completely defined against the "destination" relation.

Signals representing the completed cursor from PDSC 538 are now placed within a CURSOR data structure 158, and the module DO QUERY is called to open the cursor and define a new QUERY data structure 162 corresponding to the new cursor, all as described above. (The cursor defined against the "starting" relation remains open.) The current screen-file continues to be accessed; the new screen# is provided from the descend action (descend# via screen#). Operation of the data processing system according to this module, with respect to a particular cursor, has been explained in detail.

The result in the present case is that the records in the "destination" relation, defined by the cursor (provided by PDSC 538 and completed with specific relationship field values from the retrieved record occurrence from the "starting" relation), are sequentially retrieved from database 516, merged with a screen-format of screen-set 532 within screen-file 512, and displayed to the user on display 18. The user can actuate PF keys 204 in the manner described, in order to modify the record occurrences whose representations are displayed; for example, the user can update or delete occurrences, or can add new ones to the "destination" relation of database 516.

When the user has viewed as many of the record occurrences within the "destination" relation as is desired, and has performed any desired operations on them, actuation of the Return PF key 204-16 causes DOQUERY module 108 to return to its caller. Alternatively, when all record occurrences within the destination relation have been viewed, such return is accomplished automatically by unstacking the recursion. The next record occurrence of the "starting" relation is then retrieved by FETCH module 602. The descend process is now repeated for the record occurrences from the "destination" relation related to the next record occurrence of the "starting" relation. When all related record occurrences for all the record occurrences of the starting relation have been viewed, operation according to WZPXI module 114 with respect to the cursor for the starting relation is resumed. The LIST screen is redisplayed, with members of the starting relation represented on it.

Operation. An example of the above operation will be described, referring now to the exemplary records shown in FIG. 23. Operating according to DD Definition module 500 and to input signals from keyboard 20, data processing system 10 constructs a Data Dictionary 506 from the "Sales" database 516. During such construction, a relationship is defined by the user between the Customer records and the Order records. The Customer table is defined as the parent table; the Customer# field is defined as the parent relationship field. Signals representing these definitions are stored in attribute storage 520; further, "Customer" is stored as the ascend name, and "Orders" as the descend name, of the relationship, and signals representing the characters of these names are stored at 524. A relationship ID# is assigned to these attributes, and is an index to relationship attribute storage 520. The ID# is stored in the descriptor 570 for the Customer table, and also in a descriptor 570 for the Order table.

Next, operating according to Application Builder module 508, and according to input signals from keyboard 20, data processing system 10 accesses AB screen-file 510 and Data Dictionary 506 for the "Sales" database 516. Data processing system 10, operating according to module 550, and employing the relational operator described above, displays a list of table names (Customer, Order, Item, and Part) retrieved from Data Dictionary 506, in a format (such as that of FIG. 24) from AB Screen-file 510. The Customer table is selected by the user as the initial table; signals representing this table are stored in "Initial Table" of PDEF data structure 153.

Data processing system 10, further operating according to module 550, accesses the descriptor 570 of the Customer table in Data Dictionary 506, and using the Relationship ID# (or ID#s) found therein, accesses the relationship attributes storage 520. The name of each table in the database 516 that is related to the Customer table (in this case there is only one, the Order table) is displayed on display 20 in a format like that of FIG. 25. The order table is selected by the user as a related table to be included in the application program.

The LIST screen format is selected by the user as the initial screen; signals representing this format are stored in "initial screen" of PDEF data structure 153. Data processing system 10, operating according to module 552, and referring to Data Dictionary 506, accesses the @Default screen-set 511 and copies and modifies formats 521 and POPs 509. (Other control data structures, such as Screen Maps, are also constructed at this time.) Specifically, the archetype LIST format is modified for the Customer table to provide a PF key (for illustration, PF key 204-11) associated with the characters "Orders", retrieved from data element 524, indexed by the Relationship ID#; the POP table for that screen is modified to include a pop.oper "descend#1 via screen#". (The value of screen# is assignable by the user; it is assumed that the LIST screen is selected for the descend operation.) A PDSC data structure 538 is constructed for descend#1. This PDSC structure in its first portion 540 contains the pair, "@1, customer.customer#". That is, the customer# of the Customer record is the relationship field for this relationship, as is found from the signals stored in the attributes for the relationship between Customer and Order tables, indexed by Relationship ID#. In second portion 542 of PDSC 538 is provided a cursor, defined against the Order table of database 516, but with the relationship field incomplete, and indicated by @1.

Finally, the archetype screen-set formats 521 and associated POPs 509 are copied and modified to construct for the destination relation the formats 532 and control signals 534. The remainder of the built screen-file 512 (if any) is constructed, and is edited by the user as desired.

At a later time, a user of the data processing system terminal initiates operation according to PACE RUN 514 and built screen-file 512. According to the signals in PDEF data structure 153, and employing the relational operator described above, data processing system 10 operates to display the LIST screen format from formats 522 with record occurrences from the Customer table. This display includes among the representations of the selectable operations the characters "11) Orders". The user enumerates particular listed Customer record occurrences in a manner described above, and actuates PF key 204-11. In the manner described above, the signals representing actuation of this PF key are employed to retrieve from the POP table for the LIST screen format 522 the corresponding pop.oper, which is copied into qry.oper. The qry.oper-action is "descend#1 via LIST screen"; this is copied to ATAB data structure 172.

Operating according to PACE RUN, data processing system 10 employs the signals representing "descend#1" to access the PDSC data structure 538 previously built for this descend operation. The first of the enumerated Customer records (from the initial LIST screen) is fetched from database 516 and stored in System Buffer 168. The value of its Customer# field is copied to the location in PDSC portion 542 indicated by @1, thus completing the cursor. DO QUERY module 108 is then called for operation with respect to this cursor, in the manner described above. Order record occurrences for which the Customer# relationship field has the value that has been copied from the Customer record in the System Buffer are retrieved, and are displayed to the user on a LIST screen format 532.

The user can operate upon the listed Order record occurrences in the manner described. Specifically, the user can modify or delete such record occurrences, or the user can add new record occurrences (subject however to the integrity rules in the relationship attribute storage 520, which are enforced in a manner not described herein). When all such desired operations have been performed, the next enumerated Customer record from the initial LIST screen is fetched, and its Customer# is copied to the @1 location of the cursor portion 542 of PDSC data structure 538. The Order record occurrences defined by this cursor will then be retrieved. This process continues until it has been performed with respect to all enumerated Customer records from the initial LIST SCREEN.

Thus the operations which users most commonly desire to perform upon a database can all be accomplished, interactively and nonprocedurally, through the operation of the application program in the form of the built screen-file 512.

Operation of the data processing system according to my invention thus provides particularly simple means for the nonprogrammer to create an application program for the interactive, nonprocedural maintenance of a relational database, including easily accomplished transitions to the display of any records related to initially displayed records. The creation of application programs of this complexity and flexibility has hitherto required the employment of expert programmers over a considerable time, and the end product is frequently not as well suited to the actual purposes of the ultimate user as may be attained by the employment of my invention.

What is claimed is:

1. Method for retrieving from a destination relation in a stored relational database, signals representing record occurrences related to a record occurrence of a starting relation, said method comprising providing, for a relationship between particular relations in said database, stored signals representing relationship attributes including a specification of a relationship field common to said particular relations, accessing, responsive to selection of a starting paticular relation and a relationship in which said starting relation participates, said stored relationship attribute signals, generating, responsive to said relationship attributes, generic cursor signals representing a generic cursor defined against the other particular relation as a destination relation, storing said generic cursor signals in working storage, copying, responsive to a signal representing selection by an operator of a particular record occurrence in the starting relation and to an operation selection signal from the operator, values of said specified relationship field from said particular record occurrence to locations in said generic cursor to form a completed cursor, accessing in said stored database, responsive to said completed cursor, destination relation record occurrence signals defined by said completed cursor, and storing said accessed destination relation record occurrence signals in working storage.

2. The method of claim 1, further comprising the step of displaying representations of said stored destination relation record occurrence signals together with representations of a plurality of selectable operations performable with respect to destination relation record occurrences.

3. Record retrieval means for retrieving from a destination relation in a stored relational database, signals representing record occurrences related to a record occurrence of a starting relation, said means comprising storage means for providing, for a relationship between particular relations in said database, stored attribute signals representing relationship attributes including a specification of a relationship field common to said particular relations, means for accessing, responsive to selection of a starting particular relation and a relationship in which said starting relation participates, said stored relationship attribute signals, means for generating, responsive to said relationship attributes, generic cursor signals representing a generic cursor defined against the other particular relation as a destination relation, means for storing said generic cursor signals in working storage, means for copying, responsive to a signal representing selection by an operator of a particular record occurrence in the starting relation and to an operation selection signal from the operator, values of said specified relationship field from said particular record occurrence to locations in said generic cursor to form a completed cursor, means for accessing in said stored database, responsive to said completed cursor, destination relation record occurrence signals defined by said completed cursor, and means for storing said accessed destination relation record occurrence signals in working storage.

4. The record retrieval means of claim 3, further comprising means for displaying representations of said stored destination relation record occurrence signals together with representations of a plurality of selectable operations performable with respect to destination relation record occurrences.

5. The record retrieval means of claim 3, said storage means further providing, for a relation in said database, stored descriptor signals comprising a relation name, and a relationship identifier signal for each relationship in which said relation participates, said relationship identifier signal being an index to said stored atrribute signals for the corresponding said relationship, said stored attribute signals further comprising name signals representing names of the particular relations related by the relationship, said record retrieval means further comprising means for controlling an initial display of names of relations in said database, means for accessing, responsive to operator selection of a starting relation name during said initial display, a corresponding said relationship identifier signal in said descriptor signals, said means for accessing said stored relationship attribute signals being responsive to said accessed relationship identifier signal fo accessing appropriate said stored relationship attribute signals, means for controlling a next display, responsive to said accessed attribute signals, of a representation of the name of a particular relation related to said starting relation, means for deriving, responsive to operator selection of a represented said particular relation name as a destination relation during said next display, the said attribute identifier for the relationship between said starting and destination relations, means for accessing said relationship attribute signals, responsive to said derived attribute identifer, said means for generating being responsive to said accessed attribute signals.

6. The record retrieval means of claim 5, said storage means further providing stored format signals representing a modifiable run-time display format for display of representations of selectable starting relation record occurrences, and selectable operation names, and associated stored control signals for each said selectable operation, said stored attribute signals further comprising a name of said relationship, said record retrieval means further comprising means for modifying, responsive to said operator selection of a said starting relation during said next display, said stored format signals to represent an additional selectable operation identified by said relationship name, means for generating, responsive to said operator selection of a said destination relation, control signals associated with said additional selectable operation and comprising a cursor index to said stored generic cursor signals, and means for storing said generated control signals, said means for copying being responsive during display according to said run-time format signals to operator selection of a starting relation record occurrence and of said relationship name, to access said cursor index.

7. The record retrieval means of claim 6, said stored attribute signals further comprising
- status specification signals specifying parent or child relationship status of each said particular relation related by the relationship, and
- representations of an ascend relationship name and a descend relationship name, said record retrieval means further comprising name selection means responsive to said status specification signals for accessing said relationship ascend name for display with record occurrences of a starting relation having relationship child status, and for accessing said relationship descend name for display with record occurrences of a starting relation having relationship parent status, said means for modifying said stored format signals being responsive to said name selection means.

8. In a data dictionary definition means, relationship naming means comprising
- name signal generating means for forming, responsive to input relationship definition signals, signals representing default ascend and descend names of a relationship,
- means for storing said default name signals in attribute storage corresponding to said relationship,
- means for controlling the display of representations of said default relationship names,
- means for accepting operator input signals for modifying such display, and
- means for forming modified name signals representing modified relationship ascend and descend names, responsive to said operator input signals, and
- means for storing said modified name signals in said attribute storage.

* * * * *